United States Patent
Finn et al.

(10) Patent No.: US 8,259,100 B2
(45) Date of Patent: Sep. 4, 2012

(54) FIXED PATH TRANSITIONS

(75) Inventors: Peter George Finn, Brampton (CA); Rick Allen Hamilton, II, Charlottesville, VA (US); Brian Marshall O'Connell, Cary, NC (US); Clifford Alan Pickover, Yorktown Heights, NY (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1137 days.

(21) Appl. No.: 12/109,010

(22) Filed: Apr. 24, 2008

(65) Prior Publication Data

US 2009/0267950 A1    Oct. 29, 2009

(51) Int. Cl.
*G06T 15/00* (2011.01)
(52) U.S. Cl. ....................................... 345/419
(58) Field of Classification Search ............... 345/419; 715/706
See application file for complete search history.

(56) References Cited

U.S. PATENT DOCUMENTS

| | | | |
|---|---|---|---|
| 6,023,270 A | 2/2000 | Brush, II et al. | |
| 6,036,601 A | 3/2000 | Heckel | |
| 6,394,301 B1 | 5/2002 | Koch | |
| 6,421,047 B1 | 7/2002 | de Groot | |
| 6,532,007 B1 | 3/2003 | Matsuda | |
| 6,570,563 B1 * | 5/2003 | Honda | 345/419 |
| 6,580,811 B2 | 6/2003 | Maurer et al. | |
| 6,749,510 B2 | 6/2004 | Giobbi | |
| 6,788,946 B2 | 9/2004 | Winchell et al. | |
| 6,798,407 B1 | 9/2004 | Benman | |
| 6,868,389 B1 | 3/2005 | Wilkins et al. | |
| 6,895,406 B2 | 5/2005 | Fables et al. | |
| 6,954,728 B1 | 10/2005 | Kusumoto et al. | |
| 6,981,220 B2 * | 12/2005 | Matsuda | 715/706 |
| 7,025,675 B2 | 4/2006 | Fogel et al. | |
| 7,158,135 B2 | 1/2007 | Santodomingo et al. | |
| 7,305,691 B2 | 12/2007 | Cristofalo | |
| 7,320,031 B2 | 1/2008 | Konig et al. | |
| 7,454,056 B2 | 11/2008 | Hayaishi | |
| 7,454,065 B2 | 11/2008 | Satoh | |
| 7,479,967 B2 | 1/2009 | Bachelder et al. | |
| 7,542,040 B2 | 6/2009 | Templeman | |

(Continued)

OTHER PUBLICATIONS

"Super Mario 64." Nintendo as evidenced by YouTube clip uploaded Feb. 18, 2008. Web. Jan. 16, 2012. <http://www.youtube.com/watch?v=6Lrg1rp5KAA>.*

PTO Office Action for U.S. Appl. No. 12/109,040 dated Jul. 15, 2011.

Kiss et al., "Viewpoint Adaptation During Navigation Based on Stimuli from the Virtual Environment" Web3D 03' Proceedings of the Eighth International Conference on 3D Web Technology, ACM, New York, NY, 2003, p. 23.

(Continued)

*Primary Examiner* — Xiao M. Wu
*Assistant Examiner* — Scott E Sonners
(74) *Attorney, Agent, or Firm* — Yee & Associates, P.C.; Mark C. Vallone

(57) ABSTRACT

Fixed path transitions in a virtual universe environment are provided. In one embodiment, tracking data that identifies a location of an avatar in relation to a range of an object in a virtual universe is received. The range comprises a viewable field. In response to the tracking data indicating an occurrence of a trigger condition associated with a fixed path rule, a fixed path defined by the fixed path rule is identified. A speed of movement and an orientation of the object associated with the fixed path rule is identified. Movement of the object along the fixed path defined by the fixed path rule is initiated. The object then moves along the fixed path at the identified speed and with the orientation associated with the fixed path rule.

19 Claims, 13 Drawing Sheets

U.S. PATENT DOCUMENTS

| | | | |
|---|---|---|---|
| 7,685,204 | B2 | 3/2010 | Rogers |
| 7,720,835 | B2 | 5/2010 | Ward et al. |
| 7,805,680 | B2 | 9/2010 | Meyers et al. |
| 7,822,687 | B2 | 10/2010 | Brillon et al. |
| 8,001,161 | B2 | 8/2011 | Finn et al. |
| 2001/0033675 | A1 | 10/2001 | Maurer et al. |
| 2002/0024532 | A1 | 2/2002 | Fables et al. |
| 2002/0056091 | A1 | 5/2002 | Bala et al. |
| 2002/0107072 | A1 | 8/2002 | Giobbi |
| 2002/0113809 | A1 | 8/2002 | Akazawa et al. |
| 2002/0138607 | A1 | 9/2002 | O'Rourke et al. |
| 2002/0169644 | A1 | 11/2002 | Greene et al. |
| 2003/0004774 | A1 | 1/2003 | Greene et al. |
| 2004/0034561 | A1 | 2/2004 | Smith |
| 2004/0053690 | A1 | 3/2004 | Fogel et al. |
| 2004/0166935 | A1 | 8/2004 | Gavin et al. |
| 2004/0210634 | A1 | 10/2004 | Ferrer et al. |
| 2004/0220850 | A1 | 11/2004 | Ferrer et al. |
| 2005/0071306 | A1 | 3/2005 | Kruszewski et al. |
| 2005/0086112 | A1 | 4/2005 | Shkedi |
| 2005/0086605 | A1 | 4/2005 | Ferrer et al. |
| 2005/0114198 | A1 | 5/2005 | Koningstein et al. |
| 2005/0125229 | A1 | 6/2005 | Kurzweil |
| 2005/0156928 | A1 | 7/2005 | Santodomingo et al. |
| 2005/0179685 | A1 | 8/2005 | Kake et al. |
| 2005/0253872 | A1 | 11/2005 | Goss et al. |
| 2005/0286769 | A1 | 12/2005 | Satoh |
| 2006/0168143 | A1 | 7/2006 | Moetteli |
| 2006/0194632 | A1 | 8/2006 | Hendrickson et al. |
| 2006/0195462 | A1 | 8/2006 | Rogers |
| 2006/0258462 | A1 | 11/2006 | Cheng et al. |
| 2007/0003915 | A1 | 1/2007 | Templeman |
| 2007/0035561 | A1 | 2/2007 | Bachelder et al. |
| 2007/0043616 | A1 | 2/2007 | Kutaragi et al. |
| 2007/0191104 | A1 | 8/2007 | Van Luchene |
| 2007/0247979 | A1 | 10/2007 | Brillon et al. |
| 2007/0252841 | A1 | 11/2007 | Kim |
| 2007/0261109 | A1 | 11/2007 | Renaud et al. |
| 2008/0004119 | A1 | 1/2008 | Van Luchene et al. |
| 2008/0252716 | A1 | 10/2008 | Kano et al. |
| 2008/0281622 | A1 | 11/2008 | Hoal |
| 2009/0063168 | A1 | 3/2009 | Finn et al. |
| 2009/0089157 | A1 | 4/2009 | Narayanan |
| 2009/0227368 | A1 | 9/2009 | Wyatt |
| 2009/0254417 | A1 | 10/2009 | Beilby et al. |
| 2009/0267937 | A1 | 10/2009 | Finn et al. |
| 2009/0267948 | A1 | 10/2009 | Finn et al. |
| 2009/0267960 | A1 | 10/2009 | Finn et al. |
| 2009/0271422 | A1 | 10/2009 | Finn et al. |
| 2009/0299960 | A1 | 12/2009 | Lineberger et al. |
| 2009/0327219 | A1 | 12/2009 | Finn et al. |
| 2010/0001993 | A1 | 1/2010 | Finn et al. |
| 2010/0005423 | A1 | 1/2010 | Finn et al. |
| 2010/0177117 | A1 | 7/2010 | Finn et al. |
| 2010/0205179 | A1 | 8/2010 | Carson et al. |

OTHER PUBLICATIONS

Avatar-Based Marketing: The Avatar-Based Panel (Part One of Five), New World Notes, http://nwn.blogs.com/nwn/2006/06/avatarbased_mar.html, accessed Nov. 10, 2011, 15 pages.

Avatar-Based Marketing: The Avatar-Based Panel (Part Two of Five), New World Notes, http://nwn.blogs.com/nwn/2006/06/avatarbased_mar.html, accessed Nov. 10, 2011, 6 pages.

Avatar-Based Marketing: The Avatar-Based Panel (Part Three of Five), New World Notes, http://nwn.blogs.com/nwn/2006/06/avatarbased_mar.html, accessed Nov. 10, 2011, 6 pages.

Avatar-Based Marketing: The Avatar-Based Panel (Part Four of Five), New World Notes, http://nwn.blogs.com/nwn/2006/06/avatarbased_mar.html, accessed Nov. 10, 2011, 6 pages.

Avatar-Based Marketing: The Avatar-Based Panel (Part One of Five), New World Notes, http://nwn.blogs.com/nwn/2006/06/avatarbased_mar.html, accessed Nov. 10, 2011, 6 pages.

Hughes, "Those custom Reeboks and the next party," Eightbar, http://eightbar.co.uk/2006/10/11/those-custom-reeboks-and-the-next-party, accessed Oct. 11, 2006, 5 pages.

Hughes, "Planes, trains and automobiles, here come Nissan," Eightbar, http://eightbar.co.uk/2006/10/24/planes-trains-and-automobiles-here-come-nissan, Oct. 24, 2006, 3 page.

Hughes, "The Sony BMG media island, it is very good," Eightbar, http://eightbar.co.uk/2006/10/19/the-sony-bmg-media-island-it-is-very-good, Oct. 19, 2006, 8 pages.

Hughes, "Ben Folds in Second Life the Event," Eightbar, http://eightbar.co.uk/2006/10/20/ben-folds-in-second-life-the-event, Oct. 20, 2006, 3 pages.

Reynolds, "Virtual Worlds introduction presentation," Eightbar, http://eightbar.co.uk/2006/08/17/virtual-worlds-introduction-presentation, Aug. 17, 2006, 8 pages.

"Life2Life—ECS-Powered Amazon Store Within Second Life," Amazon Web Services Blog, http://aws.typepad.com/aws/2006/07/lifetolife_ecspo.html, accessed Nov. 10, 2011, 7 pages.

"Trap," NWN Wikia, http://web archive.org/web/20071112084836/http://nwn.wikia.com/wiki/Trap, accessed Sep. 14, 2011, 3 pages.

"Unseen," WOW Wiki, http://web.archive.org/web/20070207113119/http://www.wowwiki.com/Unseen, accessed Sep. 14, 2011, 2 pages.

USPTO Office Action regarding U.S. Appl. No. 11/846,724, dated Oct. 27, 2010.

USPTO Final Office Action regarding U.S. Appl. No. 11/846,724, dated Feb. 4, 2011.

USPTO Office Action regarding U.S. Appl. No. 12/108,925, dated Sep. 9, 2011.

USPTO Office Action regarding U.S. Appl. No. 12/108,968, dated Oct. 28, 2011.

USPTO Supplemental Notice of Allowance regarding U.S. Appl. No. 12/109,023, dated May 13, 2011.

USPTO Final Office Action regarding U.S. Appl. No. 12/168,657, dated Oct. 4, 2011.

USPTO Office Action regarding U.S. Appl. No. 12/353,656, dated Aug. 24, 2011.

USPTO Office Action regarding U.S. Appl. No. 12/165,922, dated Nov. 10, 2011.

USPTO office action for U.S. Appl. No. 12/109023 dated Dec. 1, 2010.

U.S. Appl. No. 12/108,925, filed Apr. 24, 2008, Finn et al.
U.S. Appl. No. 12/108,968, filed Apr. 24, 2008, Finn et al.
U.S. Appl. No. 12/108,987, filed Apr. 24, 2008, Finn et al.
U.S. Appl. No. 12/165,922, filed Jul. 1, 2008, Finn et al.
U.S. Appl. No. 12/109,023, filed Apr. 24, 2008, Finn et al.
U.S. Appl. No. 12/109,040, filed Apr. 24, 2008, Finn et al.
U.S. Appl. No. 12/168,657, filed Jul. 7, 2008, Finn et al.
U.S. Appl. No. 11/846,724, filed Aug. 29, 2007, Finn et al.

USPTO Office Action for U.S. Appl. No. 12/109,040 dated Feb. 3, 2011.

USPTO office action for U.S. Appl. No. 12/168,657 dated Apr. 26, 2011.

USPTO notice of allowance for U.S. Appl. No. 12/109,023 dated Apr. 13, 2011.

Notice of Allowance, dated Feb. 21, 2012, regarding U.S. Appl. No. 12/108,968, 21 pages.

Notice of Allowance, dated Mar. 16, 2012, regarding U.S. Appl. No. 12/108,987, 21 pages.

Gladestrider, "ZAM Everquest Classes: The Ranger—Tracking-Help," http://everquest.allakhazam.com/db/classes.html?=10&mid=1098807428716491276, dated Oct. 26, 2004, 2 pages.

Riddikulus, "Dungeons and Dragons Online Eberron Unlimited Forums: Repeating quests-limit?" http://forums.ddo.com/showthread.php?t=123676, dated Oct. 8, 2007, 6 pages.

USPTO Notice of Allowance regarding U.S. Appl. No. 12/108,925, dated Dec. 29, 2011, 18 pages.

USPTO Office Action regarding U.S. Appl. No. 12/108,987, dated Dec. 1, 2011, 39 pages.

USPTO Final Office Action regarding U.S. Appl. No. 12/353,656, dated Dec. 23, 2011, 47 pages.

\* cited by examiner

OBJECT AVATAR
RENDERING (OAR) TABLE
400

| | |
|---|---|
| 402 | RenderingUUID = PRIMARY KEY. |
| 404 | ObjectUUID = FOREIGN KEY TO EXISTING OBJECT TABLE. |
| 406 | AvatarUUID = FOREIGN KEY TO EXISTING AVATAR TABLE. |
| 408 | Zone1EnterTime = UTC DATETIME WHEN AVATAR'S SESSION STARTED. |
| 410 | Zone1LeaveTime = UTC DATETIME WHEN AVATAR LEFT THE FIRST ZONE. |
| 412 | Zone2EnterTime = UTC DATETIME WHEN AVATAR'S SESSION STARTED. |
| 414 | Zone2LeaveTime = UTC DATETIME WHEN AVATAR LEFT THE SECOND ZONE. |
| 416 | NumberOfZone1Enters = NUMERIC COUNTER OF HOW MANY TIMES AVATAR HAS ENTERED THE FIRST ZONE. |
| 418 | NumberOfZone2Enters = NUMERIC COUNTER OF HOW MANY TIMES AVATAR HAS ENTERED THE SECOND ZONE. |
| 420 | LastCoordinates = COORDINATE DATA OF WHERE THE AVATAR IS WITHIN THE ZONES. |

*FIG. 4*

OBJECT FLOATING
CONTROL TABLE
500

| | |
|---|---|
| 502 | ObjectUUID = PRIMARY KEY |
| 504 | FlotationRuleUUID = FOREIGN KEY |
| 506 | FlotationRulePriority = NUMERIC DESIGNATING PRIORITY OF RULE |

*FIG. 5*

OBJECT BASED AVATAR TABLE 1200

| RENDERING UUID = PRIMARY KEY | |
|---|---|
| 1202 OBJECT A UUID | AVATAR A UUID — 1204 |
| | AVATAR A ZONE 1 ENTER TIME — 1206 |
| | AVATAR A ZONE 2 ENTER TIME — 1208 |
| | AVATAR A ZONE 1 LEAVE TIME — 1210 |
| | AVATAR A ZONE 2 LEAVE TIME — 1212 |
| 1220 OBJECT B UUID | AVATAR A UUID — 1222 |
| | AVATAR A ZONE 1 ENTER TIME — 1224 |
| | AVATAR A ZONE 2 ENTER TIME — 1226 |
| | AVATAR A ZONE 1 LEAVE TIME — 1228 |
| | AVATAR A ZONE 2 LEAVE TIME — 1230 |
| | AVATAR C UUID — 1232 |
| | AVATAR C ZONE 1 ENTER TIME — 1234 |
| | AVATAR C ZONE 2 ENTER TIME — 1236 |
| | AVATAR C ZONE 1 LEAVE TIME — 1238 |
| | AVATAR C ZONE 2 LEAVE TIME — 1240 |

*FIG. 12*

FIXED PATH TRANSITIONS

BACKGROUND OF THE INVENTION

1. Field of the Invention

The present invention relates generally to a data processing system, and in particular, to a method and apparatus for managing objects in virtual universes. More particularly, the present invention is directed to a computer implemented method, apparatus, and computer usable program code for fixed path transitions associated with objects in a virtual universe environment.

2. Description of the Related Art

A virtual universe (VU), also referred to as a metaverse or "3D Internet", is a computer-based simulated environment. Examples of virtual universes include Second Life®, Entropia Universe, The Sims Online®, There, and Red Light Center. Other examples of virtual universes include multiplayer online games, such as EverQuest®, Ultima Online®, Lineage®, and World of Warcraft® (WoW).

Many virtual universes are represented using three dimensional (3-D) graphics and landscapes. The properties and elements of the virtual universe often resemble the properties of the real world, such as in terms of physics, houses, and landscapes. Virtual universes may be populated by thousands of users simultaneously. In a virtual universe, users are sometimes referred to as "residents."

The users in a virtual universe can interact, inhabit, and traverse the virtual universe through the use of avatars. An avatar is a graphical representation of a user that other users in the virtual universe can see and interact with. The avatar's appearance is typically selected by the user and often takes the form of a cartoon-like representation of a human. However, avatars may also have non-human appearances, such as animals, elves, trolls, orcs, fairies, and other fantasy creatures.

A viewable field is the field of view for a particular user. The viewable field for a particular user may include objects, as well as avatars belonging to other users. An object is an element in a virtual universe that does not represent a user. An object may be, for example, buildings, statues, billboards, signs, and advertisements in the virtual universe. The viewable field of a particular user is determined by the virtual universe grid software according to the geometries and textures that are currently loaded in a user's virtual universe client. The virtual universe grid determines the length of time that a user views an object based on processing the data sent to each virtual universe client.

Objects are prevalent in virtual universes. Sometimes one or more objects in a particular user's viewable field may be obstructed from view by other objects in the virtual environment such that the user is unable to see the one or more obstructed objects. For example, a sign may be hidden from view behind a statue or other larger sign. In addition, objects may prove difficult for some users to view based on their relative position and other characteristics, such as lighting and color.

SUMMARY OF THE INVENTION

The illustrative embodiments provide a computer implemented method, apparatus, and computer usable program code for fixed path transitions in a virtual universe environment. In one embodiment, tracking data that identifies a location of an avatar in relation to a range of an object in a virtual universe is received. The range comprises a viewable field. In response to the tracking data indicating an occurrence of a trigger condition associated with a fixed path rule, a fixed path defined by the fixed path rule is identified. A speed of movement and an orientation of the object associated with the fixed path rule is identified. Movement of the object along the fixed path defined by the fixed path rule is initiated. The object then moves along the fixed path at the identified speed and with the orientation associated with the fixed path rule.

BRIEF DESCRIPTION OF THE DRAWINGS

FIG. 4 is a block diagram of an object avatar rendering table in accordance with an illustrative embodiment;

FIG. 5 is a block diagram of an object floating control table in accordance with an illustrative embodiment;

FIG. 12 is a block diagram of an object based avatar table for a plurality of objects in accordance with an illustrative embodiment;

DETAILED DESCRIPTION OF THE PREFERRED EMBODIMENT

Figure 1:
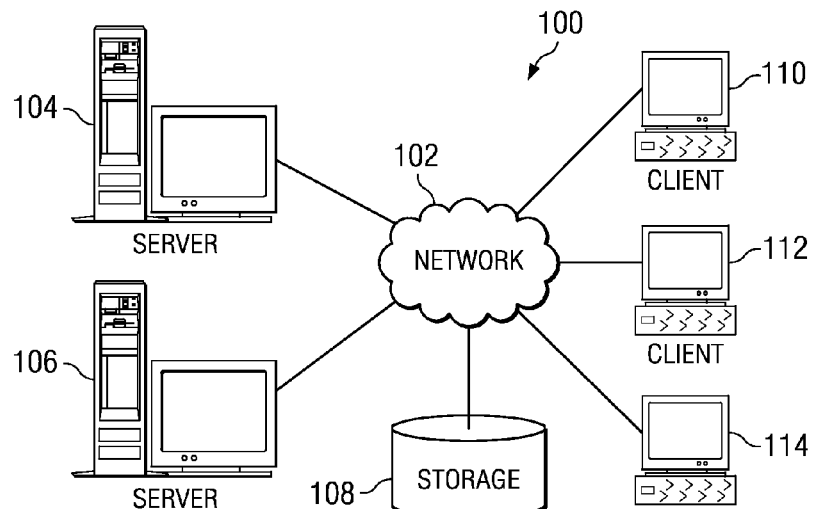
FIG. 1 is a block diagram illustrating a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable data storage medium(s) may be utilized. The computer-usable or computer-readable data storage medium may be, for example but not limited to, an electronic, magnetic, optical, or semiconductor system, apparatus, or device. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable data storage medium may be any medium that can store the program for use by or in connection with the instruction execution system, apparatus, or device. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
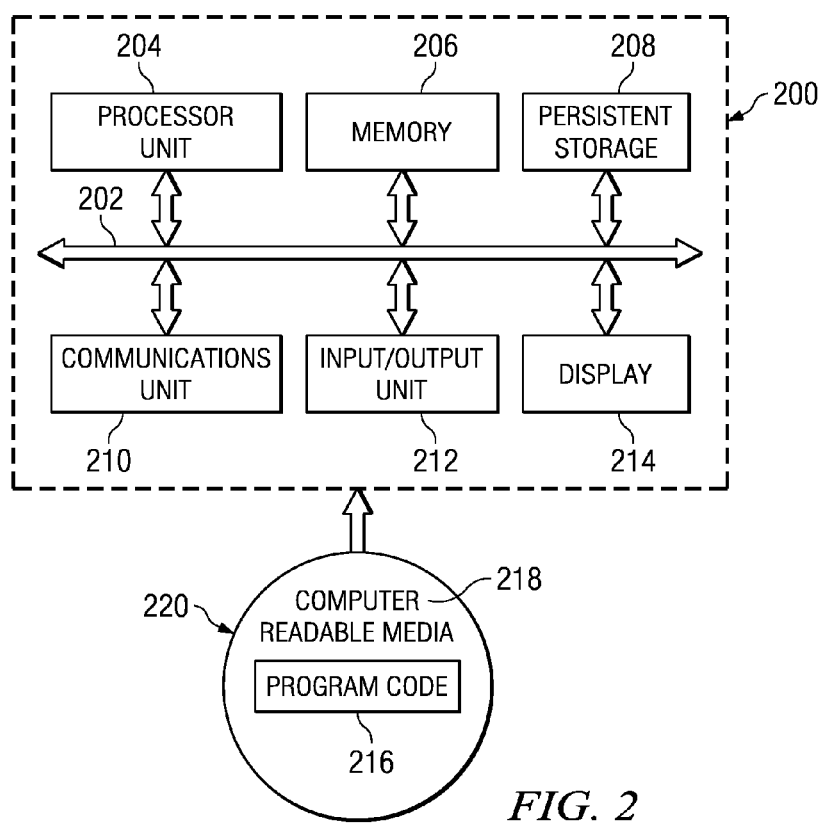
FIG. 2 is a diagram of a data processing system in accordance with an illustrative embodiment of the present invention.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. Servers 104 and 106 are servers associated with a virtual universe. Users of the virtual universe have agents on servers 104 and 106. An agent is a user's account. A user uses an agent to build an avatar representing the user. The agent is tied to the inventory of assets or possessions the user owns in the virtual universe. In addition, a region in a virtual universe typically resides on a single server, such as, without limitation, server 104. A region is a virtual area of land within the virtual universe.

Clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example.

In a virtual universe, assets, avatars, the environment, and anything visual consists of unique identifiers (UUIDs) tied to geometric data, textures, and effects data. Geometric data is distributed to a user's client computer as textual coordinates. Textures are distributed to a user's client computer as graphics files, such as Joint Photographic Experts Group (JPEG) files. Effects data is typically rendered by the user's client according to the user's preferences and the user's client device capabilities.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments. Network data processing system 100 may include additional servers, clients, and other devices not shown.

Turning now to FIG. 2, a diagram of a data processing system is depicted in accordance with an illustrative embodiment of the present invention. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disk that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

A virtual universe is a computer-simulated environment, such as, without limitation, Second Life®, Entropia Universe, The Sims Online®, There, Red Light Center, EverQuest®, Ultima Online®, Lineage®, and World of Warcraft®. A virtual universe is typically represented using three dimensional (3-D) graphics and landscapes.

The users in the virtual universe interact, inhabit, and traverse the virtual universe through avatars. Avatars represent users and are controlled or associated with users. A user can view objects and other avatars within a given proximity of the user's avatar. The virtual universe grid software determines which objects and other avatars are within the given proximity of the user's avatar according to the geometries and textures that are currently loaded in the user's virtual universe client. The virtual universe grid determines the length of time that a user views an object or other avatar in proximity of the user based on processing the data sent to each virtual universe client. However, current virtual universe systems do not enable tracking of objects and avatars within a range of one or more selected objects.

The illustrative embodiments provide a computer implemented method and apparatus for fixed path transitions of objects in a virtual universe environment. In one embodiment, tracking data that identifies a location of an avatar in relation to a range of an object in a virtual universe is received. The range comprises a viewable field. In response to the tracking data indicating an occurrence of a trigger condition associated with a fixed path rule, a fixed path defined by the fixed path rule is identified. A speed of movement and an orientation of the object associated with the fixed path rule is identified. Movement of the object along the fixed path defined by the fixed path rule is initiated. The object then moves along the fixed path at the identified speed and with the orientation associated with the fixed path rule.

The fixed path modification of an object may be implemented as the only modification of the object. In another embodiment, the fixed path may be implemented in conjunction with a floating transition for floating the object in accordance with one or more floatation actions. A flotation action is any type of floating, hovering, or almost instantaneously changing locations to improve the visibility and viewabilty of the object. For example, a flotation action implemented in conjunction with a fixed path rule includes, without limitation, floating in a fixed/stationary position, bobbing up and down vertically, floating above a surface and moving side to side horizontally, moving up and down in an arc, teleporting, hovering in one or more locations, rotating about an axis, pivoting so that a front of the object is facing the avatar, floating along a fixed path through the air, floating from a first location to a second location so that users can see the object as the object moves to the second location, moving in a zigzag pattern through the air, and/or disappearing from a first location and reappearing at a second location so that avatars cannot see the object until the object is rendered at the second location.

The fixed path may be located entirely along a surface, such as the ground, a road, a bridge, or other surface. The fixed path may be located entirely a set of distance above one or more surfaces, such that the fixed path is floating above the one or more surfaces. The fixed path may also comprise a part of the fixed path located a set of one or more surfaces and a part of the fixed path located a predetermined set of distances above the set of one or more surfaces. The set of distances comprises a single distance, as well as two or more distances. In other words, the fixed path may be located twenty feet above a surface. In another example, the fixed path may be located partially at twenty feet above the surface, partially at nineteen feet above the surface, partially at eighteen feet above the surface, and so on. In this example, the fixed path moves an object along a floating fixed path that appears to be a ramp moving up into the air away from the surface and/or a slide dropping down towards the surface.

Figure 3:
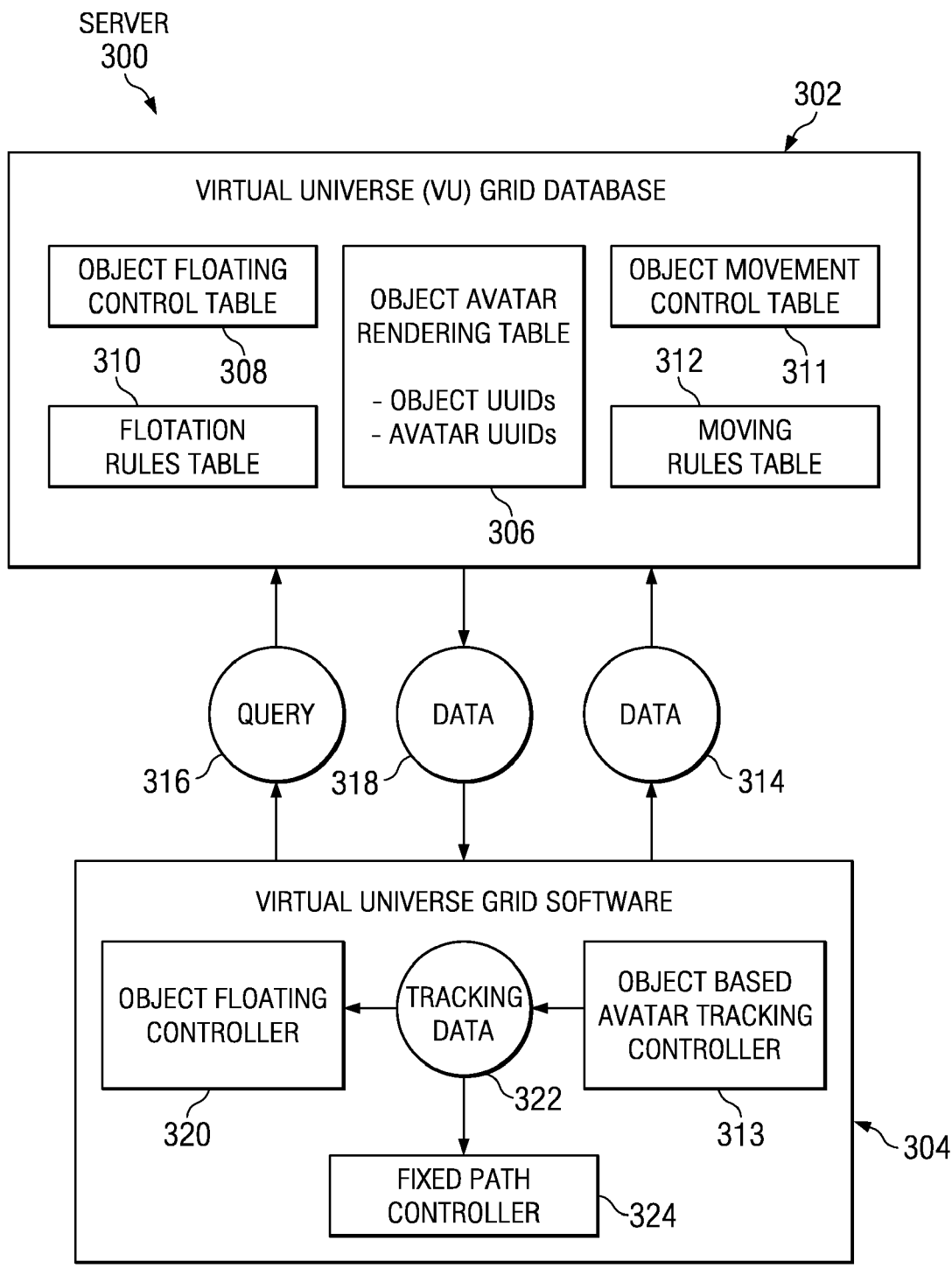
FIG. 3 is a block diagram illustrating a virtual universe grid server in accordance with an illustrative embodiment.

FIG. 3 is a block diagram illustrating a virtual universe grid server in accordance with an illustrative embodiment. Server 300 is a server associated with a virtual universe. In this example, server 300 is a server in a virtual universe grid computing system or in a cluster of two or more servers for rendering and managing a virtual universe. In another embodiment, server 300 is a single, stand-alone server.

Virtual universe grid database 302 is a database on the grid computing system for storing data used by virtual universe grid software 304 to render and manage the virtual universe. Virtual universe grid database 302 includes object avatar rendering (OAR) table 306. Object avatar rendering table 306 stores object unique identifiers and avatar unique identifiers.

In a virtual universe, assets, avatars, the environment, and anything visual consists of unique identifiers (UUIDs) tied to geometric data, textures, and effects data. Geometric data is data associated with the form or shape of avatars and objects in the virtual universe. Geometric data may be used to construct a wire frame type model of an avatar or object. Geometric data is distributed to a user's client computer as textual coordinates. Textures are distributed to a user's client computer as graphics files, such as JPEG files. Texture data refers to the surface detail and surface textures or color that is applied to wire-frame type geometric data to render the object or avatar. Effects data is typically rendered by the user's client according to the user's preferences and the user's client device capabilities.

Object avatar rendering table 306 stores a unique identifier (UUID) for each selected object in the virtual universe. A selected object is an object in a plurality of objects in the virtual universe that is tracked, monitored, managed, or associated with object avatar rendering table 306. Object avatar rendering table 306 also stores unique identifiers and other data describing avatars within a viewable field of a selected object or within a selected zone or range associated with the selected object. For example, if the selected objects include object A and object B, then object avatar rendering table 306 stores object A unique identifier, unique identifiers and other data for all avatars within the viewable field of object A, object B unique identifier, and unique identifiers and other data describing all avatars within the viewable field of object B.

Virtual universe grid database 302 also includes object floating control (OFC) table 308 and floatation rules (FR) table 310. Object floating control table 308 is a table storing object unique identifiers (UUIDs) and flotation rules. Flotation rules govern floating modifications to an object, such as, without limitation, how high an object floats above a surface, where an object floats, changes in location of the object, and/or changes in orientation of the object. A flotation rule specifies an action, motion, or change associated with floating the selected object.

Flotation rules may include set coordinates at which an object floats, coordinates at which an object does not float, a minimum and/or a maximum distance the selected object can float away from a given avatar, a minimum and/or maximum distance the selected object can float from a given fixed location, a minimum and/or maximum height above a surface, and/or a minimum distance that must be maintained away from another object, such as a competitor's building or advertisement. For example, a flotation rule may specify that an object cannot float more than thirty meters above a surface.

The flotation rules may also specify where an object can float and where an object cannot float relative to dynamic changes in the virtual universe environment. For example, and without limitation, the flotation rules may prohibit the object from floating directly on top of an avatar, in the path of a moving avatar, or floating within a proximity of an object associated with a competitor.

Flotation rules for floating transitions optionally include floating movements associated with continual fluctuations, such as, without limitation, a bobbing motion to draw attention of users to the object and to enhance the effect of the floating nature of the object. For example, and without limitation, one flotation rule specifies that the selected object will bob up and down or move vertically up and down. Another flotation rule specifies that the selected object will move horizontally side to side at a predetermined or variable distance above a surface. The horizontal motion may be continuous or sporadic.

A sporadic flotation motion refers to a motion that periodically slows or stops for a moment before resuming the motion and/or previous speed of movement. For example, an object may float with a bobbing motion up and down from a first location to a second location, but periodically pause when at an apex at the second location, and then resume the continuous up and down motion without pausing when the object reaches the apex at the second location. This creates a sporadic or interrupted motion rather than a smooth, uninterrupted pattern of up and down motion.

In another embodiment, the flotation rule specifies a flotation action that is similar to a teleport of an object. In this case, the object is moved from a first location to a second location without depicting any motion or traveling by the object. The object disappears at the first location and reappears at the second location. For example, a region may have a number of hot spots.

A hot spot is a location at which an avatar sees an object. If two users are in a room having a hot spot on each wall with a total of four hotspots, having objects on all four walls could be annoying as well as unnecessary or duplicative. Instead of presenting the object in partial obscurity to user A's right and left over user B's shoulder, the object is only displayed over user B's shoulder. Similarly, the object is only presented over user A's shoulder for viewing by user B. If both user A and user B turn to face the same direction, after a stabilization period, the object may materialize on a wall in front of the users. A quick scan around the room would verify that this newly materialized or teleported object is the only object in the room.

A trigger condition triggers one or more motions and/or modifications to the selected object. For example, a trigger condition may trigger a flotation rule that causes the selected object to float above a fixed position or rotate about an axis. In another embodiment, the trigger condition triggers initiation of a fixed path transition.

A trigger condition is any condition that triggers initiation of a flotation rule and/or a fixed path rule. A trigger may be any type of event or condition, such as, without limitation, an avatar unique identifier, a location of an avatar, proximity of an avatar to one or more other avatars, a time of day, a location of the object, and/or any other conditions. In an embodiment where the trigger is an avatar, the input data used to determine whether the trigger condition has occurred includes the angle and pitch of the avatar's head and/or eyes. The angle and pitch are used to determine the optimal location and orientation of the selected object relative to the angle and pitch of the avatar's head and/or eyes. For example, if five avatars are in a huddle, the angle and pitch of their heads and/or eyes causes the object to float between the huddle, along the ground, and/or oriented up. The flotation rules take into account limitations of physics when implementing floating transitions, such as, without limitation, space constraints.

A single trigger condition may initiate a single flotation rule. For example, one trigger condition may trigger a flotation rule that floats an object up and down vertically. Another trigger condition may trigger a different flotation rule for the horizontal motion. In another example, a trigger condition in which a group of two or more avatars are standing in a group may trigger a flotation rule that modifies the selected object to float into the middle of the group and hover above the group of avatars.

In another embodiment, a trigger condition may initiate two or more flotation rules. For example, a single trigger condition may initiate a flotation rule that causes the object to float and a second flotation rule that causes the object to rotate about an axis. In such a case, the selected object floats above the fixed point and rotates in the floating position. In another example, the selected object rotates and then floats. In yet another example, object floating controller 320 modifies the selected object to continuously rotate as the object is floating above the fixed position in response to the trigger condition.

If two or more flotation rules are triggered and the rules conflict with each other, object floating controller 320 uses a priority ranking associated with each flotation rule to determine which flotation rule to implement with respect to the selected object.

In another embodiment, object floating control table 308 comprises a field that designates the hierarchy of each flotation rule, such as, without limitation, by a numeric system or other designation indicating which rule has priority. For example, a rule with a higher number is given priority over a rule with a lower number.

Object floating control table 308 optionally stores a priority for each flotation rule. The priority indicates which flotation rule takes priority when conditions are met for initiating more than one flotation rule. In one embodiment, the priority for the flotation rules comprises a hierarchy of rules. When multiple rule matches occur, such that two or more flotation rules have been triggered, object floating controller 320 determines which flotation rule has priority based on the priority indication and/or the flotation rules position in the hierarchy of flotation rules.

The hierarchy of flotation rules may be implemented by ordering the flotation rules. Application logic in object floating controller 320 is responsive to the ordering. In other words, object floating controller 320 determines which rule has priority based on the ordering of the rules.

In another embodiment, object floating control table 308 comprises a field that designates the hierarchy, such as, without limitation, by a numeric system or other designation indicating which rule has priority. For example, a rule with a higher number is given priority over a rule with a lower number.

Flotation rules table 310 is a table storing templates for flotation rules and actions for flotation rules. In this embodiment, flotation rules table 310 is a separate table than object floating control table 308. However, in another embodiment, flotation rules table 310 is included within object floating control table 308 rather than being implemented as a separate table.

Object movement control table 311 is a table for storing the unique identifiers of objects and fixed path rules. Each fixed path rule specifies a fixed path along which the object is permitted to move. A fixed path is a route of travel that is fixed or unvarying. The fixed path does not change based on dynamically changing events in the virtual universe, such as locations of avatars, locations of other objects, and so forth. A fixed path is like train tracks. The path a train travels along the train tracks does not vary away from the tracks. Likewise, an object moving along a fixed path cannot leave the fixed path or alter the course of the fixed path.

Each fixed path rule identifies a unique fixed path for a particular object to travel along when the given unique fixed path rule is triggered. Avatars and other objects cannot be located at any point along a fixed path. In other words, once a fixed path is specified for a particular object, no other object can be placed in the fixed path. Thus, the fixed path never becomes blocked or obstructed by other objects.

A fixed path rule may optionally also include orientations for the object as the object moves along the fixed path. As an object is moving along a fixed path, the fixed path rules may permit the object to pivot to the left, pivot to the right, rotate about an axis, tilt up, tilt down, and/or make any other change in orientation to enable one or more avatars to better view the object as the object moves along the fixed path. For example, if an object moving along a fixed path is facing away from an avatar within a viewable field of the object, the object can rotate about an axis without leaving the fixed path so that the front of the object is facing the front of the avatar. This re-orientation of the object improves the visibility of the object.

A particular fixed path rule is implemented to control fixed path transitions made to a selected object based on trigger conditions. For example, and without limitation, a first trigger condition triggers a first fixed path that moves the object along a fixed path to the right while a different trigger condition triggers a different, second, fixed path that moves the object along a fixed path to the left and then doubles back to the right. In another example, a trigger condition in which a group of two or more avatars are standing in a group triggers a fixed path rule that modifies the selected object to move along a fixed path that circles around the group of avatars.

A fixed path rule may also be a path that moves an object through the air as opposed to a path on the ground. In the example above in which a group of avatars triggers a fixed path rule, the fixed path rule may move the object along a fixed path that circles around the group at twenty meters above the ground. Thus, a fixed path may be a fixed path along the ground or a fixed path that is a given distance above the ground.

In one embodiment, object movement control table 311 also comprises a hierarchy for each fixed path rule. When multiple fixed path rule matches occur, such that two or more fixed path rules are triggered, fixed path controller 324 determines which fixed path rule has priority based on the fixed path rules' positions in the hierarchy of flotation rules. A fixed path rule with a higher position in the hierarchy is implemented rather than a fixed path rule with a lower position in the hierarchy. In this example, the fixed path rule with the lower position in the hierarchy is not implemented at all.

In another embodiment, the hierarchy of fixed path rules is implemented by ordering the fixed path rules. Application logic in fixed path controller 324 is responsive to the ordering. In other words, fixed path controller 324 determines which rule is implemented first based on the position of each fixed path rule in the hierarchy. The fixed path rule with a higher position in the hierarchy is implemented first. The fixed path rule with the second highest position in the hierarchy is implemented second. In other words, the fixed path rules are implemented consecutively, one after the other, in accordance with the hierarchy of rules.

In another embodiment, object movement control table 311 comprises a field for each fixed path rule that designates the hierarchy of each fixed path rule. The field may designate the hierarchy of each fixed path rule by using any type of indicator, such as, without limitation, by a numeric indicator, an alphanumeric indicator, or other designation indicating which fixed path rule has priority. For example, and without limitation, a rule with a higher number in the field is given priority over a rule with a lower number.

Object movement control table 311 optionally stores a priority for each fixed path rule. The priority indicates which fixed path rule takes priority when conditions are met for initiating two or more fixed path rules. When two or more fixed path rules are triggered, object movement control table 311 determines which fixed path rule has priority based on the priority indication and/or the flotation rules position in the hierarchy of flotation rules. In other words, a first fixed path that moves an object along a path in a northwest direction may be given priority over a second fixed path that moves the object along a path towards the south if there are three avatars to the north and only one avatar to the south, even if the second fixed path has a higher position in the hierarchy than the first fixed path.

Moving rules table 312 is a table storing templates for fixed path rules. In this embodiment, moving rules table 312 is a separate table than object movement control table 311. However, in another embodiment, moving rules table 312 is included within object movement control table 311 rather than being implemented as a separate table.

Virtual universe grid software 304 is software for rendering the virtual universe. Virtual universe grid software 304 includes object based avatar tracking controller 313 and object floating controller 320. Object based avatar tracking controller 313 is software for tracking avatars within the viewable field of each selected object. Object based avatar tracking controller 313 enables virtual universe grid software 304 on server 300 to track avatars and where the avatars are looking. In other words, object based avatar tracking controller 313 can determine when an avatar is looking at a particular object and/or when an avatar is within a specified range of the object such that the avatar is able to see the object or the avatar may soon be able to see the object.

Object based avatar tracking controller 313 stores data 314 in object avatar rendering table 306. Data 314 includes, without limitation, the unique identifiers and other data describing avatars within the viewable field of one or more selected objects. When object based avatar tracking controller 313 needs information about an avatar within the range of an object from object avatar rendering table, object based avatar tracking controller 306 sends query 316 to object avatar rendering table 306. In response to query 316, virtual universe grid database 302 sends data 318 to virtual universe grid software 308 for utilization by object based avatar tracking controller 313. Data 318 comprises data to track avatars and implement modifications of the selected objects to improve the position and appearance of the selected objects within the virtual universe and enable improved visibility of the selected objects. Object based avatar tracking controller 313 uses data 318 and other information describing the position and location of avatars relative to one or more objects to form tracking data 322. Tracking data 322 is used for implementing geometric and texture modifications in the virtual universe, such as floating transitions.

Object floating controller 320 is software for implementing floating transitions to modify objects in a non-fixed floating manner such that the object can have greater freedom of movement to ensure greater time seen by users and improved quality of viewing by users.

Object floating controller 320 modifies a position and orientation of an object based on an occurrence of a trigger. A trigger occurs when one or more conditions are met. Object floating controller 320 determines whether one or more conditions for a trigger have occurred based on input that enables object floating controller 320 to determine a location and/or orientation of one or more avatars relative to one or more selected objects. In one embodiment, object floating controller 320 uses input, such as, without limitation, data 318 and/or tracking data 322 to determine whether conditions for a given trigger for a floating transition is satisfied.

However, object floating controller 320 is not required to utilize data from object avatar rendering table 306. Object floating controller 320 may use any data to determine optimal location and orientation according to the definition of the object owner or virtual universe grid administrator. For example, object floating controller 320 may use data conveying a list of avatar unique identifiers within a specified range of a selected object.

Fixed path controller 324 is software for implementing fixed path transitions to move objects along a fixed path in the virtual universe to ensure greater time seen by users and improved quality of viewing by users.

Fixed path controller 324 moves an object along a predefined, fixed path and optionally modifies an orientation of the object based on an occurrence of one or more trigger conditions. A trigger occurs when one or more predetermined conditions are met. Fixed path controller 324 determines whether one or more conditions for a trigger have occurred based on input that enables fixed path controller 324 to determine a location and/or orientation of one or more avatars relative to one or more selected objects. In one embodiment, fixed path controller 324 uses input, such as, without limitation, data 318 and/or tracking data 322 to determine whether conditions for a given trigger for a fixed path rule is satisfied.

However, fixed path controller 324 is not required to utilize data from object avatar rendering table 306. Fixed path controller 324 may use any data to determine whether to trigger a fixed path rule to move an object along a fixed path according to the definition of the object owner or virtual universe grid administrator. For example, fixed path controller 324 may use data conveying a list of avatar unique identifiers within a specified range of a selected object.

In this case, when data indicates one or more avatars associated with avatar unique identifiers in the list of avatar unique identifiers come within the range of the selected object, object floating controller 320 and/or fixed path controller 324 determines whether a trigger condition for a flotation rule and/or a fixed path rule has been satisfied. When the trigger occurs, the specified object is modified to float or otherwise altered in position and/or orientation to increase the visibility of the selected object relative to the one or more avatars.

FIG. 4 is a block diagram of an object avatar rendering table in accordance with an illustrative embodiment. Object avatar rendering table 400 is an example of data in an object avatar rendering table, such as object avatar rendering table 306 in FIG. 3.

RenderingUUID 402 is a primary key for object avatar rendering table 400. ObjectUUID 404 is a unique identifier for a selected object in a virtual universe. ObjectUUID 404 is a foreign key to the existing object table. AvatarUUID 406 is a foreign key to an existing avatar table. AvatarUUID 406 includes a unique identifier for each avatar in the viewable field of the object associated with objectUUID 404.

Zone1EnterTime 408 is a field of a date and/or time when an avatar enters a first zone within the viewable field of an object. Zone1LeaveTime 410 is a field for a date and/or time when the avatar leaves the first zone. Zone2EnterTime 412 is a field in object avatar rendering table 400 for storing a date and/or time when an avatar enters a second zone. Zone2LeaveTime 414 is a field for storing the date and/or time when a given avatar leaves the second zone. The second zone may be an area that is outside the viewable field. In other words, the second zone is an area in which an avatar cannot see the selected object, but the area is in close proximity to the viewable field in which the avatar will be able to see the object. The second zone may be referred to as a detection zone or detection area.

Zone1EnterTime 408, Zone1LeaveTime 410, Zone2EnterTime 412, and Zone2LeaveTime 414 are shown as a coordinated universal time (UTC), such as zulu or Greenwich Mean Time (GMT). However, these fields are not limited to using UTC date and/or time. The date and/or time when avatars enter a zone or leave a zone may also be provided using a data and/or time from any type of calendaring system and/or any time zone.

When an avatar enters the second zone, the object avatar tracking controller software may begin preparing to display the object to the avatar when the avatar does eventually enter the viewable field. In addition, when one or more avatars enters or exits either the first zone or the second zone, the object floating controller and the fixed path controller uses the information describing the avatars position in the first and second zone to determine whether to initiate a floating action or a fixed path and/or whether to discontinue a floating action or a fixed path modification of the object. In other words, when an avatar is leaving zone 2, the fixed path controller may determine that the avatar is no longer within a viewable field of the object and/or no longer within a range of the fixed path. In such a case, the fixed path controller may terminate the fixed path transitions and restore the object to its original location and orientation.

NumberofZone1Enters 416 is a field for storing the number of times a particular avatar has entered the first zone. This information may be useful to determine whether the user has never viewed the object and, therefore, content associated with an object should be displayed in full to the user associated with the avatar. Information regarding the number of times an avatar has entered the range of the object may also be used to determine which modifications of the object should be implemented. For example, an object modification may include, without limitation, floating the object above a surface and/or moving the object along a fixed path.

The information in NumberofZone1Enters 416 is also used to determine whether the user has viewed the object one or more times in the past, and therefore, the content associated with the object should be displayed in part, skip introductory material, be modified or abbreviated, or otherwise altered so that the exact same content is not displayed to the user every time the user is within the viewable field of the object.

NumberofZone2Enters 418 is a field for storing the number of times an avatar has entered the second zone. LastCoordinates 420 is a field for storing the coordinate data describing where a given avatar is within the first zone or the second zone of a selected object. The coordinate data is typically given in xyz type coordinate data. In other words, the coordinate data includes data for the x axis, the y axis, and the z axis.

FIG. 5 is a block diagram of an object floating control table in accordance with an illustrative embodiment. Object floating control table 500 is a table storing flotation rules, such as object floating control table 308 in FIG. 3.

Object floating control table 500 stores objectUUID 502 for each selected object. Object floating control table 500 may include multiple fields with object UUIDs for selected objects.

Object floating control table 500 also includes a field for each flotation rule with a flotation rule unique identifier identifying the flotation rule, such as FlotationRuleUUID 504. FlotationRuleUUID 504 is an example of a field in object floating control table 500 for storing flotation rules associated with each object. Object floating control table 500 may include multiple flotation rules for each selected object. A flotation rule is implemented to modify a selected object associated with the flotation rule when one or more conditions associated with the flotation rule are met.

FlotationRulePriority 506 is a field in object floating control table 500 that designates the priority and/or hierarchy of a given flotation rule. Each flotation rule in object floating control table 500 has an associated priority and/or hierarchy in FlotationRulePriority 506. When two or more flotation rules are triggered, the object floating controller uses the priority and/or hierarchy of each triggered flotation rule to determine which flotation rules are implemented and which flotation rules are not implemented.

Some flotation rules can be implemented together. For example, a flotation rule to float an object and rotate an object can be implemented together. Other flotation rules conflict and are not implemented together. For example, a flotation rule that bounces an object up and down vertically may conflict with a flotation rule that moves the object horizontally. These flotation rules are implemented separately, such as one after the other. In another example, a higher priority flotation rule is implemented rather than a conflicting lower priority flotation rule.

The priorities in object floating control table 500 may also be associated with a weighting, such as, without limitation, a weighting on a scale or a weighting based on individually specified trigger conditions. These weighted trigger conditions may be referred to as priority triggers. For example, a trigger associated with an avatar coming within a viewable field of the selected object for the first time is given greater weight than a trigger associated with a time of day or a trigger associated with a different avatar coming within the viewable field of the selected object for the third time. Thus, a condition in which an avatar is viewing an object for the first time is a priority trigger over that of a condition associated with an avatar that is a repeat viewer of the object.

In addition, in another embodiment, the priorities include a set of absolute priorities. The set of absolute priorities is a set of one or more absolute priorities. An absolute priority takes precedence over all other priorities. For example, an absolute priority may state that any time a trigger associated with an avatar viewing the selected object for the first time occurs, that trigger trumps all other triggers.

In the event multiple flotation rules are triggered for a given object with the same priority, the flotation rules are executed using any type of logic for determining which flotation rule in the set of flotation rules having the same priority will be executed. For example, and without limitation, flotation rules with the same priority are executed sequentially based on the order of the flotation rules in the database or the unique identifier of the flotation rules in object floating control table 500. The order in which flotation rules having the same priority are implemented may be determined on the fly based on trigger priority, priority of avatars within the range of the selected object, crowd density, number of avatars within range of the selected object, the presence of obstructing objects, the presence of objects associated with a competitor, and/or the number of times the avatars have viewed the object.

Figure 6:
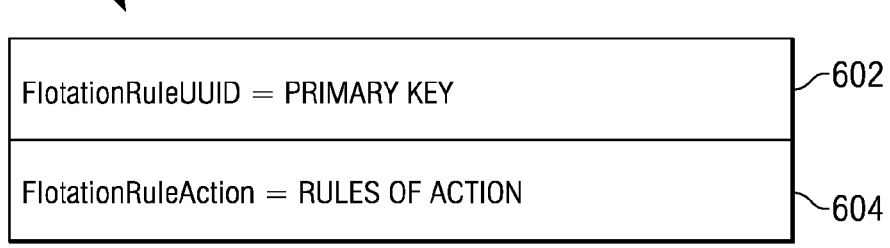
FIG. 6 is a block diagram of a flotation rules table in accordance with an illustrative embodiment.

FIG. 6 is a block diagram of a flotation rules table in accordance with an illustrative embodiment. Flotation rules 600 is a table for storing templates for flotation rules, such as flotation rules table 310. FlotationRuleUUID 602 is a field for storing a unique identifier for a flotation rule template. Flotation rules table 600 may include multiple fields for storing multiple flotation rule templates.

FlotationRuleAction 604 is a template for storing the rules of the action associated with a given flotation rule. Each flotation rule in flotation rules table 600 is associated with rules of action. The flotation rules of action include, without limitation, boundary coordinates, maximum speed of flotation or movement, rate of speed change, such as acceleration and/or deceleration, positional limits, angular limits, and/or movement effects, such as straight from point A to point X, curved from point A to point B to point Z, and so forth.

Figure 7:
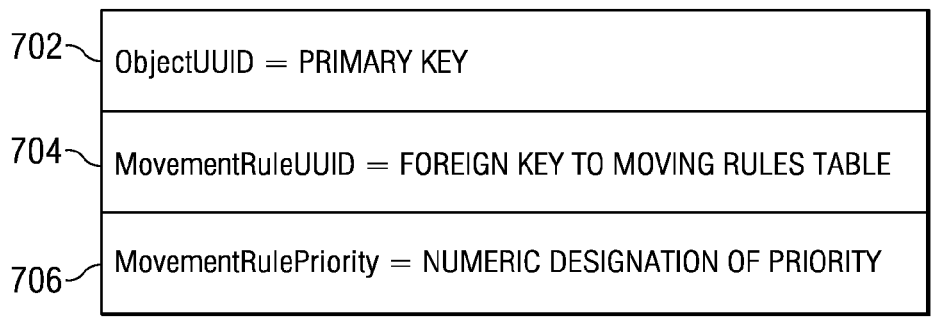
FIG. 7 is a block diagram of an object movement control table in accordance with an illustrative embodiment.

FIG. 7 is a block diagram of an object movement control table in accordance with an illustrative embodiment. Object movement control table 700 is a table for storing object unique identifiers and fixed path rules, such as object movement control table 311 in FIG. 3.

ObjectUUID 702 is a field for a unique identifier for a selected object. MovementRuleUUID 704 is a field for storing a unique identifier for a fixed path rule. MovementRulePriority 706 is a field for storing a numeric designating priority of the fixed path rule identified in MovementRuleUUID 704. In the event that there are multiple rules queried for the object identified in objectUUID 702, this numeric designation is used by the fixed path controller to determine which fixed path rule is implemented.

In one embodiment, the priorities in object movement control table 700 are associated with a weighting, such as, without limitation, a weighting on a scale and/or a weighting based on individually specified trigger conditions. These weighted trigger conditions may be referred to as priority triggers for fixed path rules. For example, a trigger associated with two avatars coming within a viewable field of the selected object may be given greater weight than a trigger associated with a time of day or a trigger associated with a single avatar coming within the viewable field of the selected object. Likewise, an avatar coming within the viewable field of an object may be a higher priority trigger than an avatar coming within the viewable field of the object for the second or third time as a repeat viewer of the object. In addition, in another embodiment, the priorities for fixed path rules may include a set of absolute priorities.

In the event that multiple fixed path rules are triggered for a given object with the same priority, the rules are executed using any type of logic for determining which fixed path rule in the set of fixed path rules having the same priority will be executed. For example, and without limitation, rules with the same priority may be executed sequentially based on the order of the rules in the database or based on the unique identifier of the rules in object movement control table 500. In another example, the rules with the same priority are implemented randomly or alphabetically. The order in which fixed path rules having the same priority are implemented may be determined on the fly based on trigger priority, priority of avatars within the range of the selected object, crowd density, number of avatars within range of the selected object, the presence of obstructing objects, the presence of objects associated with a competitor, and/or the number of times the avatars have viewed the object.

Figure 8:
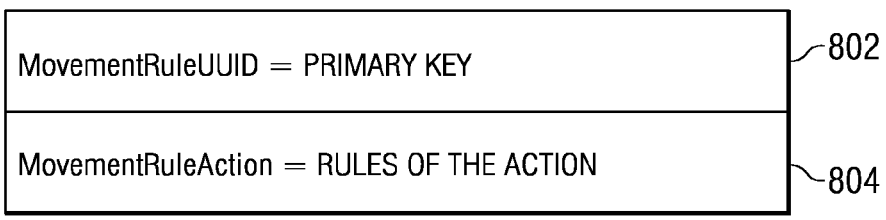
FIG. 8 is a block diagram of a moving rules table in accordance with an illustrative embodiment.

FIG. 8 is a block diagram of a moving rules table in accordance with an illustrative embodiment. Moving rules table 800 is a table for storing templates for fixed path rules, such as moving rules table 312 in FIG. 3.

MovementRuleUUID 802 is a field for storing a unique identifier for a fixed path rule template. Moving rules table 800 may include multiple fields for storing multiple flotation rule templates. MovementRuleAction 804 is a template for storing the rules of the path and orientations associated with a given fixed path rule. Each fixed path rule in movement rules table 800 is associated with a definition for the path. The path definition includes, without limitation, boundary coordinates, maximum speed of movement along the path, minimum speed of movement along the path, distance above the ground, distance above a surface, rate of speed change, such as acceleration and/or deceleration, positional limits, angular limits, and/or reorientation effects, such as tilting up or down, pivoting to the left or the right, rotating about an axis, or otherwise changing an orientation of the object as the object moves along the fixed path.

Figure 9:
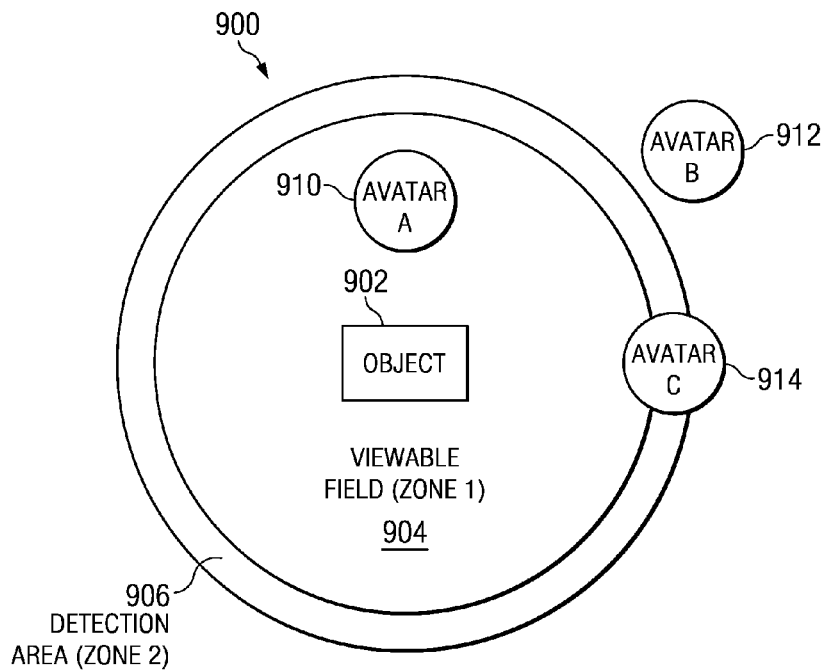
FIG. 9 is a block diagram of a viewable area for an object in accordance with an illustrative embodiment.

FIG. 9 is a block diagram of a viewable area for an object in accordance with an illustrative embodiment. Range 900 is defined with respect to object 902. Object 902 is an element in a virtual universe that is not directly controlled by a user or associated with a user's account. An object may be, for example, buildings, statues, billboards, signs, and advertisements in the virtual universe. In this example, object 902 is an advertisement, such as a billboard or a sign. Range 900 is an area associated with the viewing of object 902. Range 900 includes viewable field 904 and detection area 906 associated with object 902 in a virtual universe.

Viewable field 904 is an area in a given proximity of object 902. Viewable field 904 has a focal point or center at a location that is the same as the location of object 902. Viewable field 904 may also be referred to as zone 1 or a first zone. An avatar in viewable field 904 is able to see or view object 902 and/or content associated with object 902. For example, object 902 may be associated with video and/or audio content. Object 902 may have some movement associated with the object. For example, object 902 may be capable of some limited movement or animation. However, object 902 is substantially limited to a single location in the virtual universe.

Detection area 906 is an area adjacent to viewable field 904 within range 900. Detection area 906 may also be referred to as a second zone or zone 2. An avatar in detection area 906 cannot see object 902 or view content associated with object 902. However, when an avatar enters detection area 906, the object avatar tracking controller software can begin preparing to display object 902 and content associated with object 902 to the avatar when the avatar enters viewable field 904.

In this example, avatar A 910 is within viewable field 904. Therefore, avatar 910 is able to view or see object 902. Avatar B 912 is not able to see or view object 902. In addition, avatar B 912 is not close enough to viewable field 904 to indicate that avatar B 912 may be preparing to enter viewable field 904. Avatar C 914 is within detection area 906. Avatar C 914 is not able to see or view object 902. However, the presence of avatar C 914 indicates that avatar C 914 may be about to enter viewable field 904 or that avatar C 914 has just left viewable field 904. Avatar B 912 is outside range 900. Therefore, an object avatar tracking table for object 902 includes entries for avatar A 910 in zone 1 and avatar C 914 in zone 2. However, the object avatar tracking table will not include data or records for avatar B 912 because avatar B 912 is outside both viewable field 904 and detection area 906.

Objects are prevalent in virtual universes. The illustrative embodiments recognize that objects in a particular user's viewable field may be obstructed from view by one or more other objects such that a user cannot see the object because of the obstruction. In such cases, the focal point of the viewable area for an object may be set at a location other than the location of the object.

Figure 10:
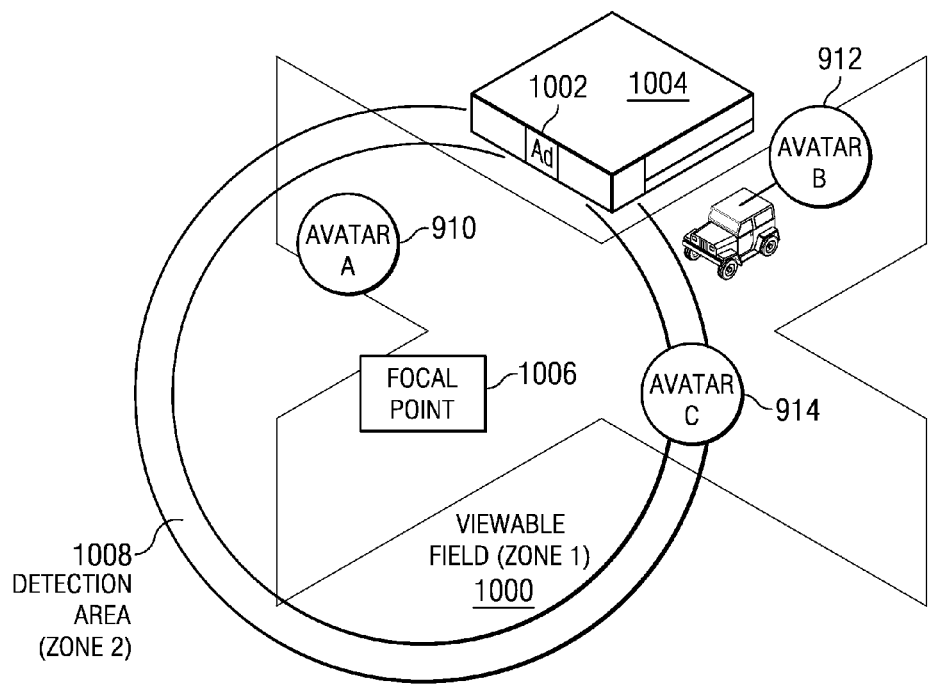
FIG. 10 is a block diagram of a viewable area for an object having a focal point at a location other than the location of the object in accordance with an illustrative embodiment.

Referring now to FIG. 10, a block diagram of a viewable area for an object having a focal point at a location other than the location of the object is shown in accordance with an illustrative embodiment. Viewable field 1000 is a viewable field for object 1002. In this example, object 1002 is an advertisement in front of object 1004. Viewable field 1000 is a range in which an avatar, such as avatar A 910, avatar B 912, and avatar C 914 can see object 1002.

Viewable field 1000 has focal point 1006. Focal point 1006 is a point from which the range, or area, of viewable field 1000 for an object is determined. In other words, viewable field 1000 is an area that is identified based on a predetermined radius or distance from focal point 1006. Here, focal point 1006 is a location that is different than the location of object 1002 because object 1002 is adjacent to an obstructing object, such as object 1006.

In this example, when avatar C 914 comes in range of detection area 1008 of object 1002, object based avatar tracking controller, such as object based avatar tracking controller 313 in FIG. 3, makes a determination as to whether there is an existing session associated with the unique identifier of object 1002 and the unique identifier of avatar C 914. This step may be implemented by making a query to the object avatar rendering table to determine if avatar C 914 has ever entered zone 2 or zone 1 previously. If there is not an existing session for avatar C 914, the object based avatar tracking controller creates a record in the object avatar rendering table with the unique identifier of object 1002 and the unique identifier of avatar C 914.

The record in the object avatar rendering table may optionally include additional information, such as, without limitation, a date and time when avatar C 914 entered zone 2, a date and time when avatar C 914 leaves zone 2, a date and time when avatar C 914 enters zone 1, a number of zone 2 enters, a number of zone 1 enters, coordinates of avatar C 914, and any other data describing avatar C 914. This data is used by the virtual universe grid software for analysis, reporting, and billing purposes.

Object 1002 may have an initiation process associated with object 1002. For example, if object 1002 is an advertisement with an audio and video content associated with viewing object 1002, an initiation process may include buffering the audio and/or video content, checking a cache for the audio and/or video content, caching the audio and/or video content, or any other initiation process.

In another embodiment, the initiation process may include sending messages to an object floating controller, such as object floating controller 320 in FIG. 3. The message may notify the object floating controller to retrieve tracking data, such as tracking data 322 in FIG. 3, because an avatar is in range of object 1002.

When avatar C 914 enters viewable field 1000, an object based avatar tracking controller may trigger any object initiation process defined by object 1002. For example, when avatar C 914 enters viewable field (zone 1) 1000, the object based avatar tracking controller may display the buffered or cached content. If a user is viewing the object for the first time and object 1002 has a video or audio file associated with viewing the object, the process starts playing the video or audio from the beginning.

In another embodiment, an object floating controller, such as object floating controller 320 in FIG. 3, queries an object floating control table, such as object floating control table 500 in FIG. 5, when avatar C 914 enters detection area 1008.

If a session already exists, the object based avatar tracking controller triggers any object re-initiation process defined by the object. For example, if the user is not viewing an object with an associated video for the first time, the process starts playing the video at a point in the video after the beginning, such as after an introduction, in a middle part, or near the end of the video to avoid replaying introductory material.

The object based avatar tracking controller makes a determination as to whether the position of avatar C 914 has changed. Changing position may include traveling, turning, walking, or disappearing, such as teleporting, logging off, or disconnecting. When the position of avatar C 914 changes, the object based avatar tracking controller adds the user position data to the object avatar rendering table, such as at a field for last coordinates 420 in FIG. 4. The user position data includes angle of view coordinate data of the avatar relative to object 1002 and the distance of avatar C 914 to object 1002.

The floating object controller may then modify object 1002 according to the flotation rules in the object floating control table, such as object floating control table 500 in FIG. 5. The modification of object 1002 is capable of improving the visibility of object 1002 to an avatar in viewable field 1000.

When avatar C 914 is out of range of viewable field 1000 and detection area 1008, the object based avatar tracking controller logs a session pause for the session associated with avatar C 914. The log may include the date and time of the session pause. When the session has been paused for an amount of time that exceeds a threshold amount of time, the object based avatar tracking controller terminates the session associated with avatar C 914. The process termination may include, without limitation, removing the records and data associated with avatar C 914 from the object avatar rendering table. If the record is not deleted, when avatar C 914 comes back into range of zone 1 or zone 2 of object 1002, the object based avatar tracking controller determines that an existing session associated with the unique identifier of object 1002 and a unique identifier of avatar C 914 already exist. In such a case, a new record for avatar C 914 will not be created.

Instead, the data in the object based avatar rendering table will be updated with new data regarding avatar C 914 in the range of object 1002.

Figure 11:
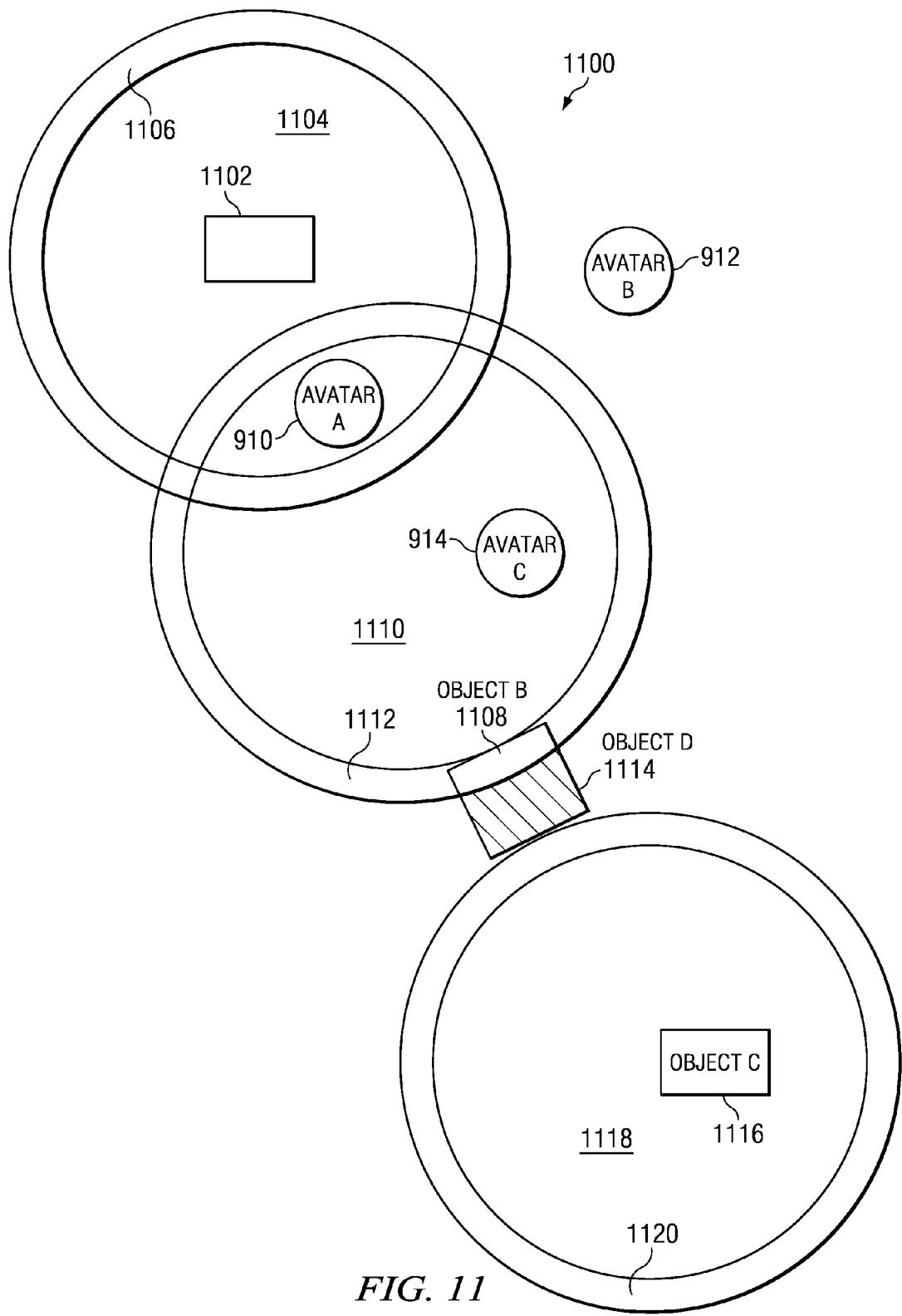
FIG. 11 is a block diagram of viewable areas for a plurality of objects in accordance with an illustrative embodiment.

FIG. 11 is a block diagram of viewable areas for a plurality of objects in accordance with an illustrative embodiment. Region 1100 is a region in a virtual universe. Region 1100 is associated with a server, such as server 104 in FIG. 1. Each region in a virtual universe is typically supported by a different server.

Object 1102 is associated with viewable field (zone 1) 1104. Object 1102 may also optionally have a detection area (zone 2) 1106. Viewable field (zone 1) 1110 is a viewable area associated with object B 1108. Viewable field 1110 has a focal point at a location other than the location of object B 1108 because object D 1114 is an obstructing object to object B 1108. Object B 1108 may also have detection area (zone 2) 1112. In this example, viewable field 1110 overlaps in part with a portion of viewable field 1104. Object C 1116 is associated with viewable field 1118. Object C 1116 is optionally associated with detection area (zone 2) 1120.

In this example, avatar A 910 is within viewable field 1104 of object A 1102 and viewable field 1110 of object B 1108. In other words, avatar A 910 can see object A 1102 or object B 1108. Avatar C 914 is within viewable field 1110 of object B 1108. Avatar C 914 is able to see or view object B 1108. Avatar C 914 is outside the viewable fields of objects 1102, 1108, 1114, and 1118.

FIG. 12 is a block diagram of an object based avatar table for a plurality of objects in accordance with an illustrative embodiment. Object based avatar table 1200 is an object based avatar table for a plurality of selected objects. In this example, object based avatar table 1200 includes a unique identifier for selected object A 1202 and object B 1220. Data describing avatars for each selected object are also included.

For example, object based avatar table 1200 includes avatar A UUID 1204, avatar A zone 1 enter time 1206, avatar A zone 2 enter time 1208, avatar A zone 1 leave time 1210, and avatar A zone 2 leave time 1212. Object based avatar table 1200 includes data regarding avatars associated with zone 1 and zone 2 of object B 1220. For example, and without limitation, object based avatar table 1200 includes avatar A UUID 1222, avatar A zone 1 enter time 1224, avatar A zone 2 enter time 1226, avatar A zone 1 leave time 1228, avatar A zone 2 leave time 1230, avatar C UUID 1232, avatar C zone 1 enter time 1234, avatar C zone 2 enter time 1236, avatar C zone 1 leave time 1238, and avatar C zone 2 leave time 1240.

The fields and data shown in object based avatar table 1200 are only examples of fields and data that may be included in an object based avatar table. However, implementations of object based avatar tables are not limited to only including the data and/or fields shown in FIG. 12. An object based avatar table may include additional data and/or additional fields not shown in FIG. 12.

In addition, object based avatar table 1200 in this example only includes data and fields for two objects and two different avatars. However, an object based avatar table may include fields and/or data for any number of objects and any number of avatars. In other words, object based avatar table 1200 may include fields and/or data for a single object, as well as two or more objects. Likewise, object based avatar table 1200 may include fields and/or data for tracking a single avatar associated with each object, as well as two or more avatars associated with each object's viewable field and/or detection area.

Figure 13:
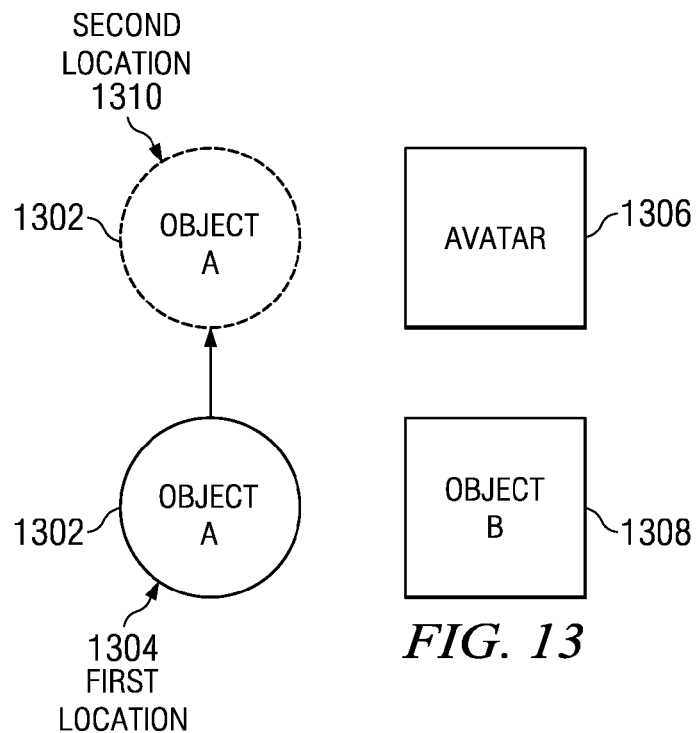
FIG. 13 is a block diagram of a floating object in accordance with an illustrative embodiment.

FIG. 13 is a block diagram of a floating object in accordance with an illustrative embodiment. Object A 1302 is a selected object. A unique identifier for object A 1302 is included in an object floating control table, such as object floating control table 308 in FIG. 3 and object floating control table 500 in FIG. 5.

When object A 1302 is in first location 1304, object A 1302 is obscured from view by a user associated with avatar 1306 due to obscuring object B 1308. When a trigger event occurs, such as, without limitation, avatar 1306 entering a field of view of object A 1302, an object floating controller initiates a floating transition of object A 1302. The floating transition may include, without limitation, floating object A 1302 above a surface, tilting or reorienting object A 1302, teleporting or relocating object A 1302 to a different location, moving object A 1302 in a bobbing motion along a fixed path, moving object A 1302 in a zigzag or side to side motion as object A 1302 moves along a fixed path, turning object A 1302 forty-five degrees, turning object A 1302 ninety degrees, and/or turning object A 1302 one hundred and eighty degrees, and/or any other floating transitions implemented as object A 1302 moves along one or more fixed paths.

In this example, the floating rules move object A 1302 up and down from first location 1304 to second location 1310. Object A 1302 transitions from first location 1304 to floating above a surface at second location 1310 repeatedly or cyclically to attract the attention of avatar 1306 and/or increase the ability of the user associated with avatar 1306 to view object A 1302.

Figure 14:
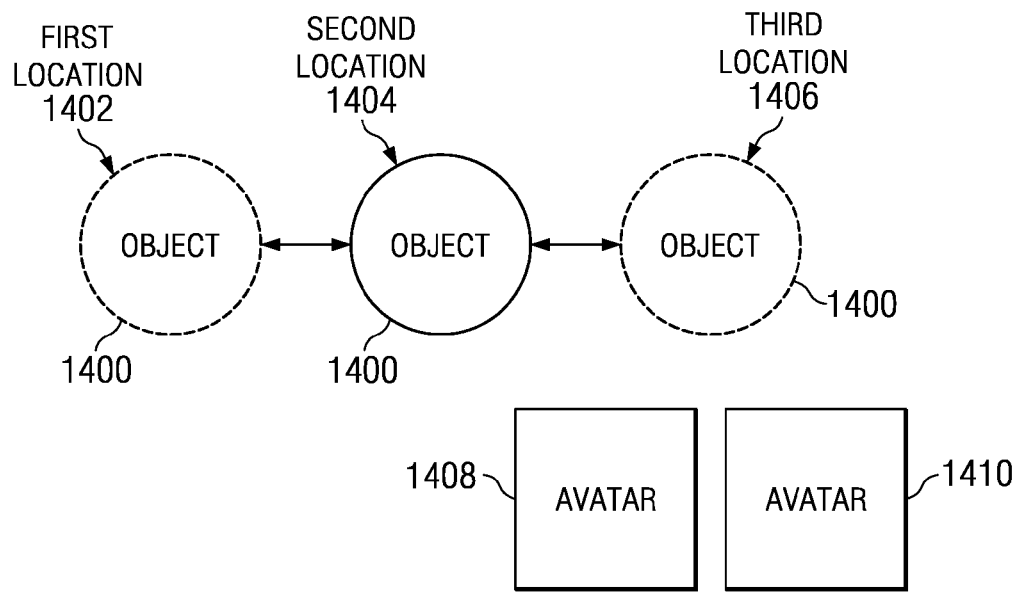
FIG. 14 is a block diagram of another floating object in accordance with an illustrative embodiment.

FIG. 14 is a block diagram of another floating object in accordance with an illustrative embodiment. Object 1400 is a selected object. Object 1400 is floating in accordance with flotation rules associated with object 1400. The flotation rules are stored in an object floating control table, such as object floating control table 308 in FIG. 3. A floating object controller uses the flotation rules to determine when and where object 1400 is able to float.

In this example, floating object controller moves object 1400 from first location 1402 along a floating path to second location 1404 and then to third location 1406. The path from first location 1402 to second location 1404 and third location 1406 is a fixed path floating along a straight line above a surface that is determined based on flotation rules, constraints, and limitations in the object floating control table and the fixed path rules in object movement control table. Floating object 1400 increases the visibility of object 1400 to avatars within a range of object 1400, such as avatar 1408 and 1410.

Figure 15:
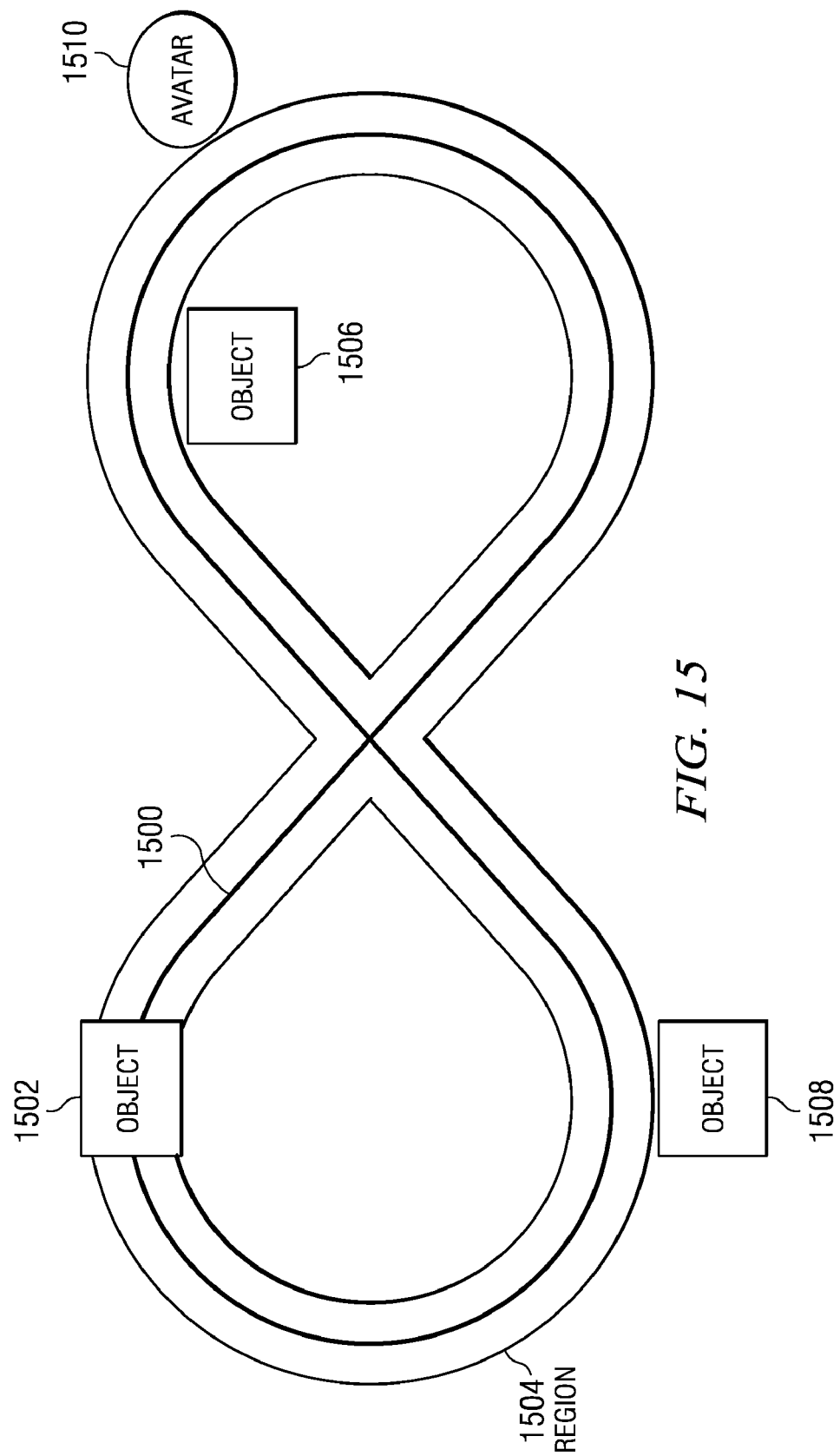
FIG. 15 is a block diagram of an object moving along a fixed path in accordance with an illustrative embodiment.

FIG. 15 is a block diagram of an object moving along a fixed path in accordance with an illustrative embodiment. Fixed path 1500 is a course, route, or path in a virtual universe environment. Fixed path 1500 is defined by a fixed path rule in an object movement control table, such as object movement control table 311 in FIG. 3. Fixed path 1500 may be a fixed path along a surface. A surface includes, without limitation, the ground, a bridge or a roadway. Fixed path 1500 may also be implemented as a fixed path floating a predetermined distance above a surface.

Object 1502 moves along fixed path 1500 at a speed defined by the fixed path rule. The fixed path rule may specify the speed at which object 1502 moves, a rate of acceleration as object 1502 moves, a rate of deceleration as object 1502 moves along the path, points along the path at which object 1502 will stop or pause for a predetermined amount of time before resuming movement along fixed path 1500, a number of circuits around fixed path 1500 that object 1502 will traverse, a direction of travel along fixed path 1500, such as, moving forward or reversing direction to backtrack along fixed path 1500, and/or a number of objects that may travel along fixed path 1500 simultaneously. In other words, the fixed path rule specifies how many objects may be moving along fixed path 1500 at the same time, when and where each object moving along fixed path 1500 starts moving and stops moving, and/or how fast each object moves along fixed path 1500.

Only selected objects associated with fixed path 1500, such as object 1502, can move along fixed path 1500. Other objects, such as objects 1506-1508 cannot be located on fixed path. In other words, other objects cannot obstruct or block fixed path 1500 because fixed path 1500 reserves or blocks the space required for object 1502 to move along fixed path 1500.

The fixed path rule may also define region 1504 bordering fixed path 1500. Region 1504 reserves or takes up additional space bordering fixed path 1500 to permit object 1502 and/or any other selected objects moving along fixed path 1500 to pivot, tilt, rotate, or otherwise re-orient as the selected objects are moving along fixed path 1500. In other words, fixed path 1500 reserves enough space for object 1502 to move along fixed path 1500 without object 1502 changing position, turning, pivoting, rotating, tilting, or changing orientation. Region 1504 is an area surrounding or adjacent to fixed path 1500 that reserves additional space to permit object 1502 to turn, rock, pivot, tilt, rotate, or otherwise reorient as object 1502 moves along fixed path 1500. It may be desirable to change the orientation of object 1502 to better enable users to view object 1502. For example, as object 1502 moves along fixed path 1500, object 1502 may be facing object 1508. As object 1502 continues to move along fixed path 1500 towards avatar 1510, the fixed path controller rotates object 1502 about an axis so that a front face of object 1502 will be facing towards avatar 1510 rather than facing towards object 1508.

In another embodiment, the speed, velocity, acceleration, deceleration, and number of times an object travels along a fixed path is determined dynamically based on the changing locations of avatars and other objects in the virtual universe environment rather than utilizing a predefined speed, velocity, acceleration, deceleration, and number of times to travel the fixed path defined in the fixed path rule.

In FIG. 15, fixed path 1500 is in the shape of a FIG. 8. However, fixed path 1500 may be any predetermined path having any predetermined shape. For example, and without limitation, fixed path 1500 may be a path along a straight line, a circle shaped path, a square shaped path, a crescent shaped or curved path, an undulating or wave form shaped path, a criss-cross path, or any other predetermined path. In addition, fixed path 1500 may include one or more locations at which an object moving along fixed path 1500 will be floated above a previous position on fixed path 1500 at a predetermined height for a predetermined period of time before returning to a previous position on fixed path 1500.

In another embodiment, fixed path 1500 is a path that is located partially along a surface and partially floating a predetermined distance above the surface. Thus, an object moving along a fixed path may be moving along a surface, such as the ground, a road, or a sidewalk, and then begin floating along a portion of the fixed path that is located a predetermined distance above the ground. The predetermined distance may be a single fixed distance or a set of distances such that the object floating along fixed path 1500 changes heights or distances above the surface. For example, if fixed path 1500 is a straight line path between point A and point B, an object moving along fixed path 1500 floating above the ground, may change heights from eight feet above the ground to ten feet above the ground along the length of fixed path 1500. In this example, the object moving along fixed path 1500 would appear to be bobbing up and down in a waving or undulating motion between eight and ten feet above the ground as the object moves from point A to point B. Thus, an object may move in an undulating motion between two or more heights above a surface as the object floats along fixed path 1500.

Figure 16:
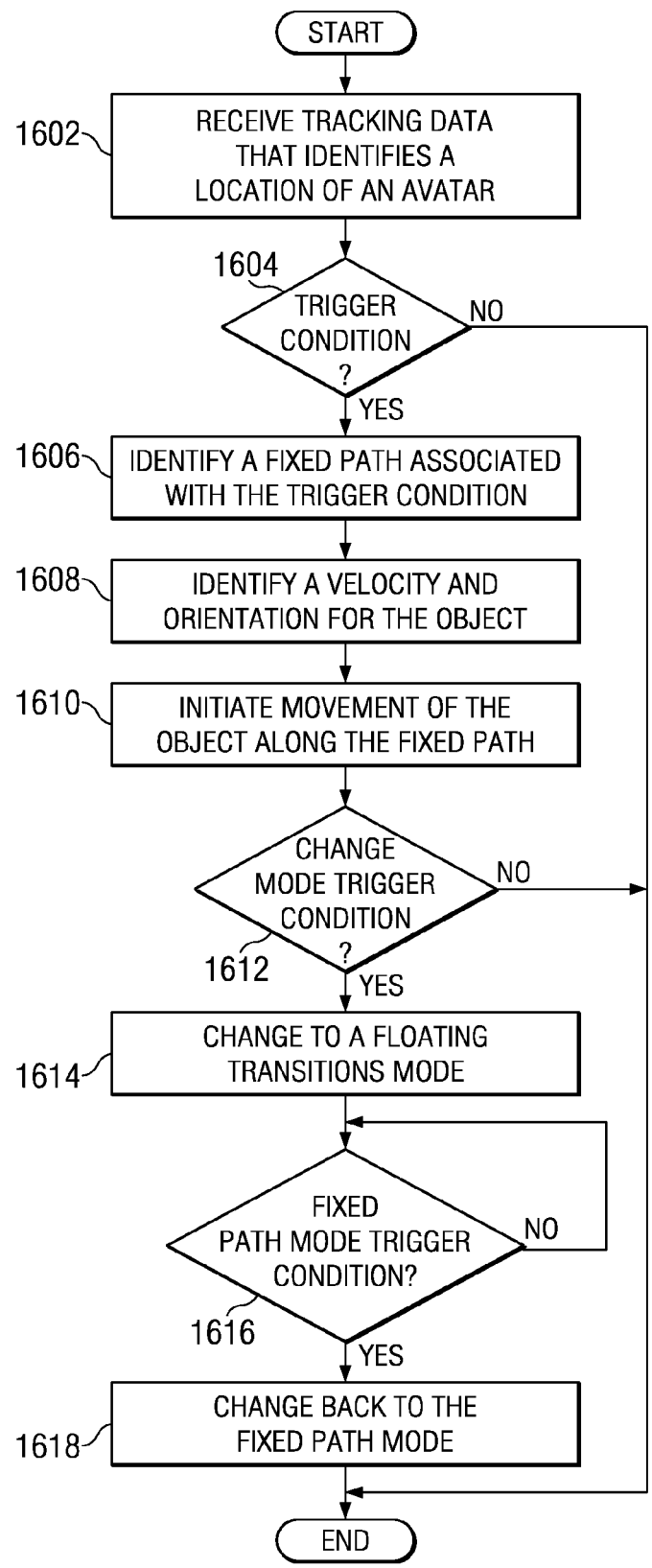
FIG. 16 is a flowchart illustrating a process for fixed path transitions in accordance with an illustrative embodiment.

FIG. 16 is a flowchart illustrating a process for a fixed path mode in accordance with an illustrative embodiment. The process is implemented by software for initiating geometric and texture modification to objects in a virtual universe environment, such as fixed path controller 324 and object floating controller 320 in FIG. 3.

The process begins by receiving tracking data that identifies a location of an avatar (step 1602). A determination is made as to whether a trigger condition associated with a fixed path rule has occurred (step 1604). A fixed path associated with the trigger condition is identified (step 1606). A velocity and orientation for an object traveling along the fixed path is determined (step 1608). Movement of the object along the fixed path is initiated (step 1610). This is a fixed path mode.

A determination is made as to whether a trigger condition has occurred that triggers a change in mode from the fixed path mode to a floating transitions mode (step 1612). If a change mode trigger condition has not occurred, the process terminates thereafter. If a change mode trigger condition does occur at step 1612, a change to a floating transitions mode is made (step 1614). During a floating transitions mode, the selected object is modified to float in accordance with flotation rules triggered by one or more trigger conditions.

A determination is then made as to whether a fixed path mode trigger condition occurs (step 1616). When a fixed path mode trigger condition occurs, a change is made form the floating transitions mode back to the original fixed path mode (step 1618) with the process terminating thereafter. During the fixed path mode, one or more fixed paths defined by fixed path rules associated with existing trigger conditions are identified and utilized to move selected objects along fixed paths.

Figure 17:
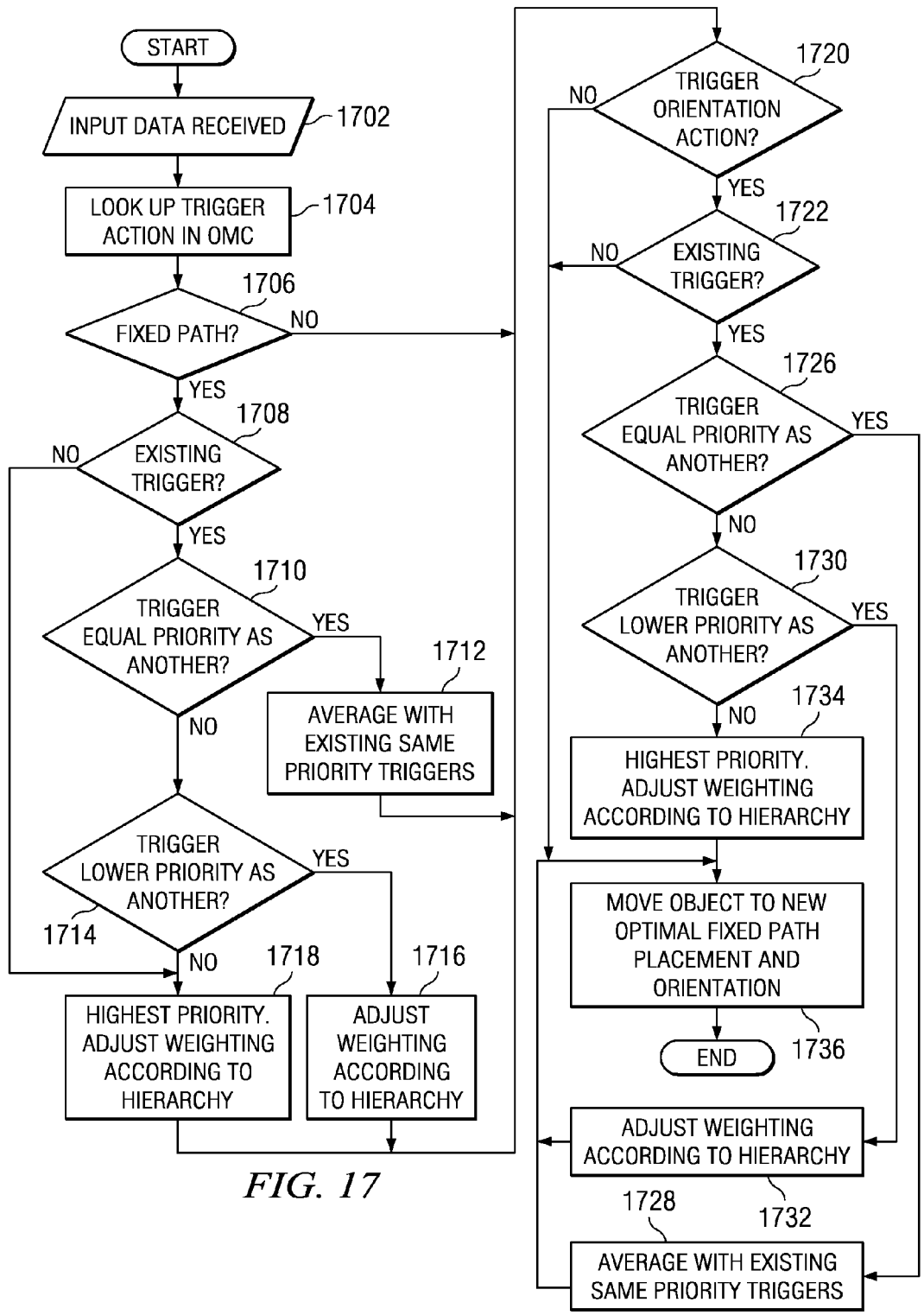
FIG. 17 is a flowchart illustrating a process for floating transitions in accordance with an illustrative embodiment.

FIG. 17 is a flowchart illustrating a process for a fixed path transitions in accordance with an illustrative embodiment. The process in FIG. 17 is implemented by software for implementing fixed path transitions in objects in a virtual environment, such as, without limitation, fixed path controller 324 in FIG. 3. The process in FIG. 17 is a more detailed description of step 1602-1610 in FIG. 16.

The process begins by receiving input (step 1702) associated with the locations of avatars. In one embodiment, the input is received from an object avatar rendering table and identifies avatars within a viewable field of a selected object. In another embodiment, the input is any data that can be used to determine a location or orientation for a selected object, such as, without limitation, a list of avatar unique identifiers to orient toward or move closer to if those avatars come into a specified proximity of the selected object.

The process looks up a most recent trigger action that corresponds to the conditions in the object movement control table (step 1704). A determination is made as to whether the most recent trigger action triggers a fixed path movement (step 1706). If the most recent trigger action triggers a fixed path movement, the process makes a determination as to whether an existing fixed path action is in effect (step 1708). For example, the process determines whether the object moved due to a second or fiftieth avatar that has come in proximity of the selected object and/or an avatar has left proximity of the selected object.

If an existing fixed path action is in effect, the process calculates an optimal location by making a determination as to whether the most recent trigger condition has a same priority as any existing fixed path trigger conditions (step 1710).

If the most recent trigger condition has the same priority, the process averages the optimal location of the movement action among the trigger conditions with the same priority (step 1712).

Returning to step 1710, if the most recent trigger condition is not the same priority, the process makes a determination as to whether the most recent trigger condition is a lower priority than any existing fixed path trigger conditions (step 1714). If the most recent trigger condition is a lower priority, the process places the most recent trigger condition in its position in the current hierarchy of fixed path trigger conditions averages the optimal location and action to move the object with a lesser weighting being given to the most recent trigger condition (step 1716).

Returning to step 1714, if the most recent trigger condition is not a lower priority, the trigger is by default a highest priority trigger among the existing fixed path trigger conditions. The process places the most recent trigger condition in its position at the top of the hierarchy of trigger conditions and averages the optimal location of action to move the object with a higher weighting being given to the most recent trigger condition relative to the other existing fixed path trigger conditions, which have lower priority (step 1718).

The process makes a determination as to whether the most recent trigger condition is associated with a fixed path rule that comprises an orientation action (step 1720). An orientation action is an action to reorient the object as the object moves along a fixed path. If the most recent trigger condition is associated with an orientation action, the process makes a determination as to whether an existing orientation action is in effect (step 1722). For example, the object may have been reoriented due to a second or fiftieth avatar coming in proximity of the selected object, or due to an avatar leaving the proximity of the object.

If an existing orientation action is in effect, the process calculates an optimal orientation to shift to according to a look-up table in the object movement control table. The process does this by making a determination as to whether the most recent trigger condition has a same priority as the existing orientations associated with existing trigger conditions (step 1726). If the priority is the same, the process averages the optimal orientation angel for the object among the orientation actions associated with the trigger conditions with the same priority (step 1728).

Returning to step 1726, if the most recent trigger condition is not the same priority, the process makes a determination as to whether the most recent trigger condition has a lower priority than the existing trigger conditions (step 1730). If the most recent trigger condition does have a lower priority, the process places the most recent trigger condition in its place in the hierarchy of orientation trigger conditions and averages the optimal orientation to modify the selected object with a lesser weighting being given to the orientation action associated with the most recent trigger condition (step 1732).

Returning to step 1730, if the most recent trigger condition is not a lower priority, the most recent trigger condition is by default the highest priority trigger condition among existing trigger conditions associated with orientation actions. The process places the most recent trigger condition in a position at the top of the hierarchy of trigger conditions and averages the optimal orientation to modify the selected object, with a higher weighting being given to the most recent trigger condition relative to the other trigger conditions, which have a lower priority (step 1734). The process then moves the object to the optimal fixed path placement and orientation (step 1736) with the process terminating thereafter.

Figure 18:
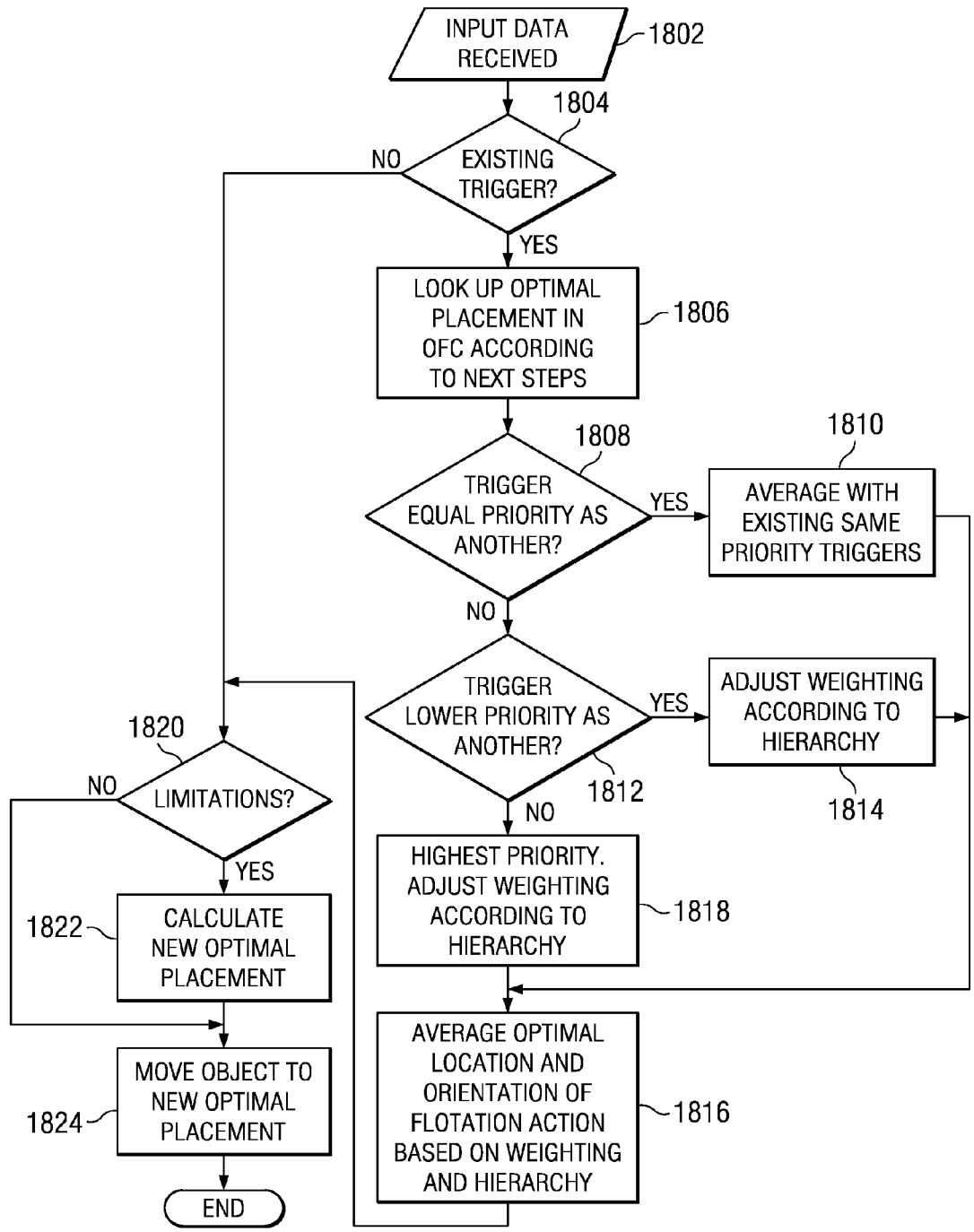
FIG. 18 is a flowchart illustrating a process for object based avatar tracking using object avatar rendering tables in accordance with an illustrative embodiment.

FIG. 18 is a flowchart illustrating a process for floating transitions in accordance with an illustrative embodiment. The process is implemented by object floating controller 320 in FIG. 3. The process in FIG. 18 is a more detailed description of step 1614 in FIG. 16.

The process begins by receiving input data (step 1802). The input data is used to determine if a predefined trigger condition has occurred. Input data includes, without limitation, data received from one or more object avatar rending table records. The process makes a determination as to whether a new trigger condition exists (step 1804) based on the input data. For example, and without limitation, the input data may be analyzed to determine whether a second avatar has come within the viewable field of the object or whether a fiftieth avatar has come within the viewable field of the object. In another example, a determination can be made as to whether an avatar has left the viewable field of the object.

If there is an existing flotation trigger condition in effect that is a new trigger condition, the process calculates an optimal location and orientation for the object based on data in the object floating control table (step 1806). The process makes a determination as to whether the new trigger condition has a same priority as any pre-existing triggers (step 1808). If yes at step 1808, the process averages the optimal location and orientation of the flotation action among the trigger conditions having the same priority (step 1810).

Returning to step 1808, if no pre-existing triggers have the same priority, the process makes a determination as to whether the new trigger condition has a lower priority than any pre-existing trigger condition priorities (step 1812). If the new trigger condition has a lower priority at step 1812, the process places the new trigger condition in a hierarchy of triggers according to the priority of the trigger conditions and adjusts the weighting of each trigger condition according to the hierarchy (step 1814). In this step, the new trigger condition is weighted with a lesser weighting relative to the condition triggers having a higher priority. In other words, the trigger conditions are weighted according to the priorities, with a trigger condition being given a greater weighting and trigger conditions with a lower priority being given a lesser weighting.

The process weights each trigger condition according to the priorities and hierarchy. The process averages the optimal location and orientation of the flotation action of the object based on a weighting of the optimal location and orientation of the trigger conditions based on the hierarchies (step 1816).

Returning to step 1812, if the new trigger condition does not have a lower priority than pre-existing trigger conditions, the process places the new trigger condition in a position at the top of the hierarchy of trigger conditions and adjusts the weighting of each trigger condition according to the hierarchy, in which the new trigger condition is given the highest priority among the pre-existing triggers (step 1818). The process averages the optimal location and orientation of the flotation action for the object based on the weighting and hierarchy (step 1816). In this case, the new trigger condition has a higher weighting relative to the other triggers having lower priorities.

After averaging the optimal location and orientation at step 1816 or after determining that there are no other existing trigger conditions at step 1804, the process makes a determination as to whether there are any limitations to the calculated optimal location and orientation (step 1820). For example, and without limitation, the process determines if the optimal location is outside a predefined boundary coordinates for the object. If yes at step 1820, the process calculates a new optimal location and orientation according to the limitation (step 1822). For example, and without limitation, the process calculates a new optimal location and orientation at the edge coordinate or edge angle at which the location would go beyond the limitation.

Returning to step 1820, if there are no limitations to the orientation and location or after calculating a new optimal placement based on the limitations, the process moves the flotation of the object to the calculated optimal location and orientation (step 1824) with the process terminating thereafter.

In another embodiment, when the object is moving from a first location and orientation to a second location and orientation, the object is animated according to a predefined speed so that users can view the contents of the object while the object is in flight. In this example, the process allows for the object to be moved from a first location and orientation to a second location and orientation along curved, nonlinear paths, such that other objects or obstructions between the first location and the second location can be avoided, circumnavigated, skirted, or minimized to permit users to view the content of the object as the object is being moved from the first location to the second location with no obstructions or minimized obstruction of the view of the object by one or more users.

Figure 19:
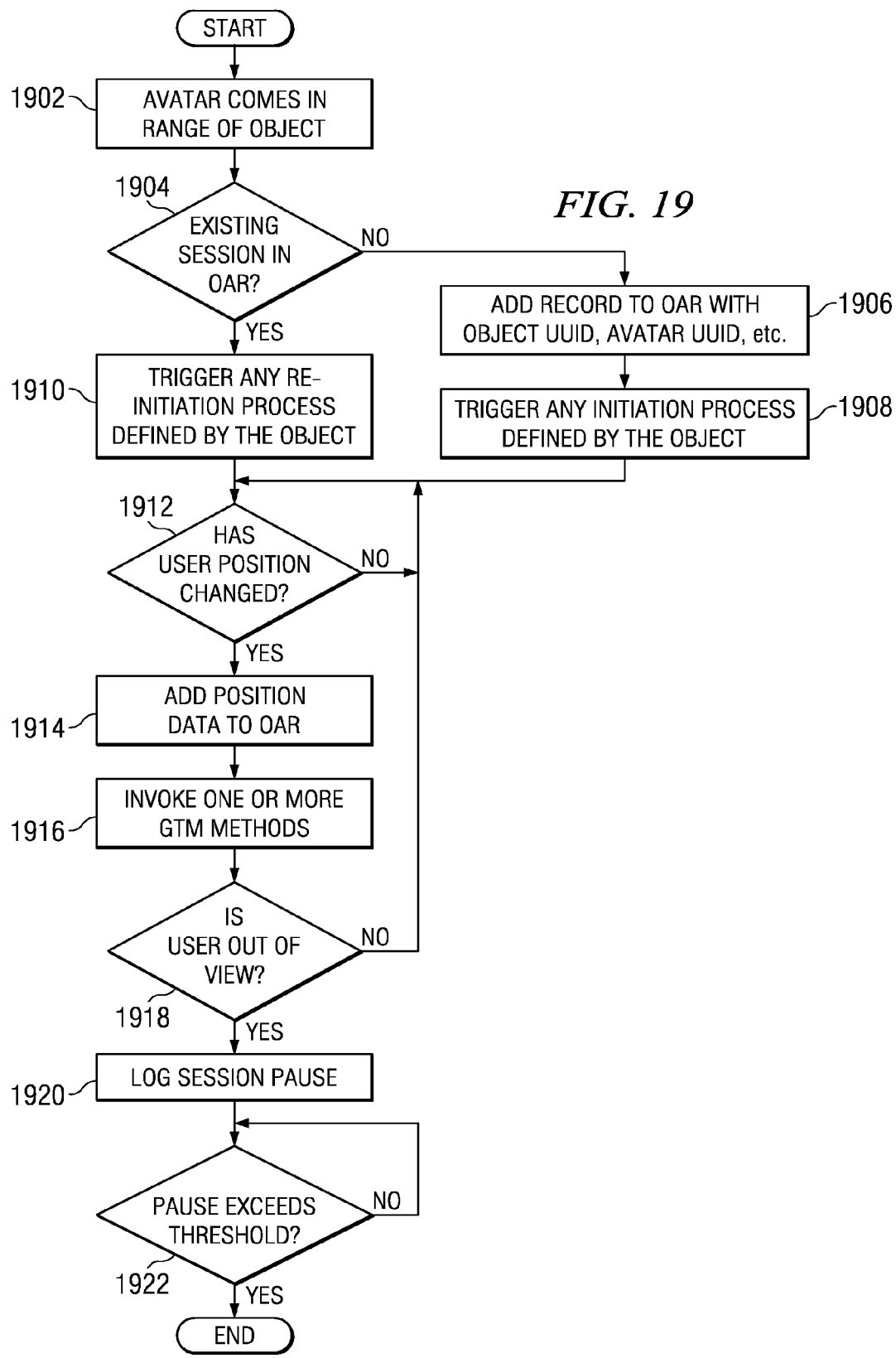
FIG. 19 is a flowchart illustrating a process for object based avatar tracking using object avatar rendering tables in accordance with an illustrative embodiment.

FIG. 19 is a flowchart illustrating a process for object based avatar tracking using object avatar rendering tables in accordance with an illustrative embodiment. The process in FIG. 19 is implemented by software for tracking avatars in a range of an object, such as object based avatar tracking controller 313 in FIG. 3. In one embodiment, the process in FIG. 19 is a more detailed description of step 1602 in FIG. 16 and/or step 1702 in FIG. 17.

The process begins when an avatar comes in range of the object (step 1902). A determination is made as to whether there is an existing session associated with the unique identifier of the object and the unique identifier of the avatar (step 1904). This step may be implemented by making a query to the object avatar rendering table for the object. If there is not an existing session, the process creates a record in the object avatar rendering table with the unique identifier of the object and the unique identifier of the avatar (step 1906). The record in the object avatar rendering table may include other information, such as, without limitation, a date and time, which can be used for analysis, reporting, and billing purposes.

The process triggers any object initiation process defined by the object (step 1908). For example, if a user is viewing the object for the first time and the object has a video associated with viewing the object, the process starts playing the video from the beginning.

Returning to step 1904, if a session already exists, the process triggers any object re-initiation process defined by the object (step 1910). For example, if the user is not viewing an object with an associated video for the first time, the process starts playing the video at a point in the video after the beginning, such as after an introduction, in a middle part, or near the end of the video to avoid replaying introductory material.

The process makes a determination as to whether the user's position has changed (step 1912). Changing position may include traveling, turning, or disappearing, such as teleporting, logging off, or disconnecting. If the user's position has not changed, the process returns to step 1912. The process may return to step 1912 if the user's position does not change within a specified amount of time. The specified amount of time may be configured by the virtual universe grid administrator or object owner. The specified amount of time may occur very frequently, such as, without limitation, after a specified number of seconds or after a specified number of milliseconds.

When the user's position changes at step 1912, the process adds the user position data to the object avatar rendering table (step 1914). The user position data includes angle of view coordinate data of the avatar relative to the object and distance of the avatar to the object. The process then performs an analysis of the position data and modifies the object according to one or more geometric and texture modification methods (GTMs) (step 1916) to improve visibility of the object.

The process then makes a determination as to whether the user is out of view (step 1918). The user may be out of view if the user or the user's avatar has disappeared or is no longer facing the object. If the user is not out of view, after a specified amount of time the process returns to step 1912. The specified amount of time may be configured by the virtual universe grid administrator or object owner. The specified amount of time may be, without limitation, a specified number of seconds or a specified number of milliseconds.

If the user is out of view at step 1918, the process logs a session pause (step 1920). The log may include the date and time. Next, the process makes a determination as to whether the session has been paused for an amount of time that exceeds a threshold amount of time (step 1922). The threshold amount of time may be configured by a virtual universe administrator or object owner. If the pause does not exceed the threshold, the process returns to step 1922. When the pause exceeds the threshold, the process terminates thereafter.

The process termination may include, without limitation, removing the records of the avatar from the object avatar rendering table. If the record is not deleted, when the avatar comes back into range of the object at step 1902, the process will make a determination at step 1904 that an existing session associated with the unique identifier of the object and a unique identifier of the avatar already exist.

Thus, the illustrative embodiments provide a computer implemented method and apparatus for fixed path transitions of objects in a virtual universe environment. In one embodiment, tracking data that identifies a location of an avatar in relation to a range of an object in a virtual universe is received. The range comprises a viewable field. In response to the tracking data indicating an occurrence of a trigger condition associated with a fixed path rule, a fixed path defined by the fixed path rule is identified. A speed of movement and an orientation of the object associated with the fixed path rule is identified. Movement of the object along the fixed path defined by the fixed path rule is initiated. The object then moves along the fixed path at the identified speed and with the orientation associated with the fixed path rule.

Objects are modified to move along a specified fixed track or according to specified threshold angles of pivoting. This gives selected objects greater freedom of movement to ensure greater exposure of users to the objects' content and increased quality of viewing by users. Objects can determine their optimal location and orientation at any given moment and then shift locations and orientations accordingly.

The objects do not have to determine if anything is blocking the fixed path or tracking of the pitch and orientation of an avatar's eyes and/or head.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely software embodiment or an embodiment containing both hardware and software elements. In a preferred embodiment, the invention is implemented in software, which includes but is not limited to firmware, resident software, microcode, etc.

Furthermore, the illustrative embodiments can take the form of a computer program product accessible from a computer-usable or computer-readable data storage medium providing program code for use by or in connection with a computer or any instruction execution system. For the purposes of this description, a computer-usable or computer-readable data storage medium can be any tangible apparatus that can store the program for use by or in connection with the instruction execution system, apparatus, or device.

The computer-readable data storage medium can be an electronic, magnetic, optical, or semiconductor system (or apparatus or device). Examples of a computer-readable data storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for fixed path transitions in a virtual universe environment, the method comprising the steps of:
    receiving, by a computer, tracking data that identifies a location of an avatar in relation to a range of an object in a virtual universe, wherein the range comprises a viewable field;
    responsive to the tracking data indicating an occurrence of a trigger condition associated with a fixed path rule, identifying, by the computer, a fixed path defined by the fixed path rule;
    identifying, by the computer, a speed and an orientation for the object associated with the fixed path rule;
    initiating, by the computer, movement of the object along the fixed path defined by the fixed path rule, wherein the object moves at the identified speed and with the orientation associated with the fixed path rule;
    responsive to an occurrence of a plurality of trigger conditions, identifying, by the computer, a priority of each trigger condition in the plurality of trigger conditions; and
    responsive to each trigger condition in the plurality of trigger conditions having a same priority, averaging, by the computer, an optimal location and orientation associated with a set of fixed path rules for each trigger condition in the plurality of trigger conditions.

2. The method of claim 1 wherein the avatar tracking data is retrieved from an object avatar rendering table by an object based avatar tracking controller.

3. The method of claim 1 wherein the fixed path comprises a set of locations and a set of orientations for an object moving along the fixed path.

4. The method of claim 1 wherein the trigger condition triggers two or more fixed path rules and further comprising:
    retrieving, by the computer, a priority for each fixed path rule triggered by the trigger condition from an object movement control table;
    identifying, by the computer, a highest priority fixed path rule triggered by the trigger condition based on the priority for the each fixed path rule; and moving, by the computer, the object along the fixed path defined by the highest priority fixed path rule.

5. The method of claim 1 wherein the trigger condition comprises two or more trigger conditions, and further comprising:
retrieving, by the computer, a weighting for each of the two or more trigger conditions from an object movement control table;
identifying, by the computer, a higher priority trigger condition using the weighting for the each of the two or more trigger conditions; and
identifying, by the computer, a fixed path rule associated with the higher priority trigger condition, wherein the object moves along a path defined by a highest priority fixed path rule and re-orients in accordance with orientation rules defined by the fixed path rule associated with the higher priority trigger condition.

6. The method of claim 1 further comprising:
identifying, by the computer, a hierarchy for a set of fixed path rules associated with the trigger condition, wherein each fixed path rule in the set of fixed path rules is associated with a ranking in the hierarchy;
identifying, by the computer, a fixed path rule having a highest ranking in the hierarchy; and
initiating, by the computer, movement of the object along the fixed path defined by the fixed path rule having the highest ranking in the hierarchy.

7. The method of claim 1 wherein a part of the fixed path is located along a surface, and wherein another part of the fixed path is located a predetermined set of distances above the surface.

8. The method of claim 1 wherein the trigger condition is a most recent trigger condition in a plurality of existing trigger conditions, and further comprising:
responsive to the most recent trigger condition having a lower priority than the plurality of existing trigger conditions, averaging, by the computer, an optimal location and orientation of a set of fixed path rules associated with the plurality of existing trigger conditions, wherein a location and orientation associated with the most recent trigger condition are given a lesser weighting than other trigger conditions in the plurality of existing trigger conditions.

9. The method of claim 1 wherein the trigger condition is a most recent trigger condition in a plurality of existing trigger conditions, and further comprising:
responsive to the most recent trigger condition having a higher priority than the plurality of existing trigger conditions, averaging, by the computer, an optimal location and orientation of a set of fixed path rules associated with the plurality of existing trigger conditions, wherein a location and orientation associated with the most recent trigger condition are given a higher weighting than other trigger conditions in the plurality of existing trigger conditions.

10. The method of claim 1 further comprising:
responsive to an occurrence of a trigger condition triggering a change in mode from a fixed path mode to a floating transitions mode, stopping, by the computer, the movement of the object along the fixed path;
identifying, by the computer, a set of flotation rules associated with a set of existing trigger conditions; and
initiating, by the computer, a set of flotation actions associated with the set of flotation rules, wherein the object is modified to float above a surface in accordance with the set of flotation actions.

11. A computer program product for fixed path transitions in a virtual universe environment, the computer program product comprising:
one or more computer-readable tangible storage devices;
program instructions, stored on at least one of the one or more computer-readable tangible storage devices, to receive tracking data that identifies a location of an avatar in relation to a range of an object in a virtual universe, wherein the range comprises a viewable field;
program instructions, stored on at least one of the one or more computer-readable tangible storage devices, to identify a fixed path defined by a fixed path rule in response to the tracking data indicating an occurrence of a trigger condition associated with the fixed path rule;
program instructions, stored on at least one of the one or more computer-readable tangible storage devices, to identify a speed and an orientation for the object associated with the fixed path rule;
program instructions, stored on at least one of the one or more computer-readable tangible storage devices, to initiate movement of the object along the fixed path defined by the fixed path rule, wherein the object moves at the identified speed and with the orientation associated with the fixed path rule;
program instructions, stored on at least one of the one or more computer-readable tangible storage devices, to identify a priority of each trigger condition in a plurality of trigger conditions in response to an occurrence of the plurality of trigger conditions; and
program instructions, stored on at least one of the one or more computer-readable tangible storage devices, to average an optimal location and orientation associated with a set of fixed path rules for each trigger condition in the plurality of trigger conditions in response to each trigger condition in the plurality of trigger conditions having a same priority.

12. The computer program product of claim 11 wherein the fixed path comprises a set of locations and a set of orientations for an object moving along the fixed path.

13. The computer program product of claim 11 wherein the trigger condition triggers two or more fixed path rules and further comprising:
program instructions, stored on at least one of the one or more computer-readable tangible storage devices, to retrieve a priority for each fixed path rule triggered by the trigger condition from an object movement control table;
program instructions, stored on at least one of the one or more computer-readable tangible storage devices, to identify a highest priority fixed path rule triggered by the trigger condition based on the priority for the each fixed path rule; and
program instructions, stored on at least one of the one or more computer-readable tangible storage devices, to move the object along the fixed path defined by the highest priority fixed path rule.

14. The computer program product of claim 11 wherein the trigger condition comprises two or more trigger conditions, and further comprising:
program instructions, stored on at least one of the one or more computer-readable tangible storage devices, to retrieve a weighting for each of the two or more trigger conditions from an object movement control table;
program instructions, stored on at least one of the one or more computer-readable tangible storage devices, to identify a higher priority trigger condition using the weighting for the each of the two or more trigger conditions; and program instructions, stored on at least one of the one or more computer-readable tangible storage devices, to identify a fixed path rule associated with the higher priority trigger condition, wherein the object moves along a path defined by a highest priority fixed path rule and re-orients in accordance with orientation rules defined by the fixed path rule associated with the higher priority trigger condition.

15. The computer program product of claim 11 further comprising:

program instructions, stored on at least one of the one or more computer-readable tangible storage devices, to identify a hierarchy for a set of fixed path rules associated with the trigger condition, wherein each fixed path rule in the set of fixed path rules is associated with a ranking in the hierarchy;

program instructions, stored on at least one of the one or more computer-readable tangible storage devices, to identify a fixed path rule having a highest ranking in the hierarchy; and program instructions, stored on at least one of the one or more computer-readable tangible storage devices, to initiate movement of the object along the fixed path defined by the fixed path rule having the highest ranking in the hierarchy.

16. The computer program product of claim 11 wherein a part of the fixed path is located along a surface, and wherein another part of the fixed path is located a predetermined set of distances above the surface.

17. The computer program product of claim 11 wherein the trigger condition is a most recent trigger condition in a plurality of existing trigger conditions, and further comprising:

program instructions, stored on at least one of the one or more computer-readable tangible storage devices, to average an optimal location and orientation of a set of fixed path rules associated with the plurality of existing trigger conditions in response to the most recent trigger condition having a lower priority than the plurality of existing trigger conditions, wherein a location and orientation associated with the most recent trigger condition are given a lesser weighting than other trigger conditions in the plurality of existing trigger conditions.

18. A computer system for fixed path transitions in a virtual universe environment, the computer system comprising:

one or more processors, one or more computer-readable memories, and one or more computer-readable tangible storage devices;

program instructions, stored on at least one of the one or more computer-readable tangible storage devices for execution by at least one of the one or more processors via at least one of the one or more computer-readable memories, to receive tracking data that identifies a location of an avatar in relation to a range of an object in a virtual universe, wherein the range comprises a viewable field;

program instructions, stored on at least one of the one or more computer-readable tangible storage devices for execution by at least one of the one or more processors via at least one of the one or more computer-readable memories, to identify a fixed path defined by a fixed path rule in response to the tracking data indicating an occurrence of a trigger condition associated with the fixed path rule;

program instructions, stored on at least one of the one or more computer-readable tangible storage devices for execution by at least one of the one or more processors via at least one of the one or more computer-readable memories, to identify a speed and an orientation for the object associated with the fixed path rule;

program instructions, stored on at least one of the one or more computer-readable tangible storage devices for execution by at least one of the one or more processors via at least one of the one or more computer-readable memories, to initiate movement of the object along the fixed path defined by the fixed path rule, wherein the object moves at the identified speed and with the orientation associated with the fixed path rule;

program instructions, stored on at least one of the one or more computer-readable tangible storage devices for execution by at least one of the one or more processors via at least one of the one or more computer-readable memories, to identify a priority of each trigger condition in a plurality of trigger conditions in response to an occurrence of the plurality of trigger conditions; and program instructions, stored on at least one of the one or more computer-readable tangible storage devices for execution by at least one of the one or more processors via at least one of the one or more computer-readable memories, to average an optimal location and orientation associated with a set of fixed path rules for each trigger condition in the plurality of trigger conditions in response to each trigger condition in the plurality of trigger conditions having a same priority.

19. The computer system of claim 18 further comprising:

program instructions, stored on at least one of the one or more computer-readable tangible storage devices for execution by at least one of the one or more processors via at least one of the one or more computer-readable memories, to detect a trigger condition;

program instructions, stored on at least one of the one or more computer-readable tangible storage devices for execution by at least one of the one or more processors via at least one of the one or more computer-readable memories, to identify a set of flotation rules associated with the trigger condition;

program instructions, stored on at least one of the one or more computer-readable tangible storage devices for execution by at least one of the one or more processors via at least one of the one or more computer-readable memories, to identify an optimal location and orientation of the object for a set of flotation actions; and program instructions, stored on at least one of the one or more computer-readable tangible storage devices for execution by at least one of the one or more processors via at least one of the one or more computer-readable memories, to initiate the set of flotation actions, wherein the location and orientation of the object is changed in accordance with the set of flotation actions associated with the set of flotation rules to float the object above a surface as the object moves along the fixed path.

* * * * *